(12) United States Patent
Shi et al.

(10) Patent No.: US 11,551,074 B2
(45) Date of Patent: Jan. 10, 2023

(54) SELF-ADAPTIVE THRESHOLD NEURON INFORMATION PROCESSING METHOD, SELF-ADAPTIVE LEAKAGE VALUE NEURON INFORMATION PROCESSING METHOD, SYSTEM COMPUTER DEVICE AND READABLE STORAGE MEDIUM

(71) Applicant: TSINGHUA UNIVERSITY, Beijing (CN)

(72) Inventors: Luping Shi, Beijing (CN); Jing Pei, Beijing (CN); Lei Deng, Beijing (CN); Zhenzhi Wu, Beijing (CN); Guoqi Li, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 755 days.

(21) Appl. No.: 16/478,458

(22) PCT Filed: Dec. 5, 2017

(86) PCT No.: PCT/CN2017/114669
§ 371 (c)(1),
(2) Date: Jul. 16, 2019

(87) PCT Pub. No.: WO2018/133570
PCT Pub. Date: Jul. 26, 2018

(65) Prior Publication Data
US 2021/0133548 A1        May 6, 2021

(30) Foreign Application Priority Data

Jan. 20, 2017 (CN) .......................... 201710041729.7
Jan. 20, 2017 (CN) .......................... 201710042067.5

(51) Int. Cl.
*G06N 3/063* (2006.01)
*G06N 3/04* (2006.01)

(52) U.S. Cl.
CPC ........... *G06N 3/0635* (2013.01); *G06N 3/049* (2013.01)

(58) Field of Classification Search
CPC ............................................. G06N 3/0635
(Continued)

(56) References Cited

U.S. PATENT DOCUMENTS

| 5,355,435 A * | 10/1994 | DeYong | G06N 3/0675 706/26 |
| 7,031,025 B1 * | 4/2006 | He | H04N 1/4057 358/3.09 |
| 2014/0114893 A1 * | 4/2014 | Arthur | G06N 3/063 706/25 |
| 2014/0365416 A1 | 12/2014 | Kim et al. | |

(Continued)

FOREIGN PATENT DOCUMENTS

| CN | 201110305539.4 | 9/2011 |
| CN | 201480071680.4 | 12/2014 |

(Continued)

OTHER PUBLICATIONS

Lee et al., "Training Deep Spiking Neural Networks Using Backpropagation", Nov. 8, 2016, Frontiers in Neuroscience, vol. 10 (Year: 2016).*
Written Opinion for PCT/CN2017/114669.
RO/101 for PCT/CN2017/114669.
(Continued)

*Primary Examiner* — James D. Rutten
(74) *Attorney, Agent, or Firm* — Dragon Sun Law Firm, PC; Jinggao Li; Nathaniel Perkins

(57) ABSTRACT

The disclosure relates to a self-adaptive leakage value neuron information processing method and system. The method includes: receiving front end pulse neuron output information; reading current pulse neuron information, wherein the current pulse neuron information includes self- (Continued)

adaptive membrane potential leakage information; calculating current pulse neuron output information according to the front end pulse neuron output information and the current pulse neuron information; updating the self-adaptive membrane potential leakage information according to the current pulse neuron output information; outputting the current pulse neuron output information. The self-adaptive leakage value neuron information processing system utilizes self-adaptive membrane potential leakage information to participate in calculation of current pulse neuron output information, and utilizes the calculated current pulse neuron output information to update the self-adaptive membrane potential information to participate in calculation of a next time step, and a good balance between sensitivity and stability of a neural network is achieved.

16 Claims, 17 Drawing Sheets

(58) Field of Classification Search
USPC .......................................................... 706/38
See application file for complete search history.

(56) References Cited

U.S. PATENT DOCUMENTS

| | | | |
|---|---|---|---|
| 2015/0106316 A1* | 4/2015 | Birdwell | G06N 3/049 706/33 |
| 2015/0295713 A1* | 10/2015 | Oxford | H04L 9/3242 713/171 |
| 2016/0331973 A1* | 11/2016 | Wheeler | A61N 1/36139 |
| 2017/0185891 A1* | 6/2017 | Hosokawa | G06N 3/049 |
| 2017/0255860 A1* | 9/2017 | Ritter | G06N 3/0635 |
| 2019/0001129 A1* | 1/2019 | Rosenbluth | A61N 1/08 |

FOREIGN PATENT DOCUMENTS

| | | |
|---|---|---|
| CN | 201710041729.7 | 1/2017 |
| CN | 201710042067.5 | 1/2017 |

OTHER PUBLICATIONS

International Search Report for PCT/CN2017/114669.
First Office Action of CN201710041729.
First Office Action of CN201710042067.
Grant Notice of CN201710042067.

* cited by examiner

SELF-ADAPTIVE THRESHOLD NEURON INFORMATION PROCESSING METHOD, SELF-ADAPTIVE LEAKAGE VALUE NEURON INFORMATION PROCESSING METHOD, SYSTEM COMPUTER DEVICE AND READABLE STORAGE MEDIUM

CROSS-REFERENCE TO RELATED APPLICATIONS

This application is a national stage application of PCT Application No. PCT/CN2017/114669. This Application claims priority from PCT Application No. PCT/CN2017/114669, filed Dec. 5, 2017, and This application claims the priority of the Chinese patent application entitled "Self-adaptive Threshold Neuron Information Receiving Method and System", filed on Jan. 20, 2017 and with the application number of 201710042067.5, and the priority of the Chinese patent application filed on Jan. 20, 2017, with the application number of 201710041729.7, and entitled "Self-adaptive Leakage Value Neuron Information Sending Method and System", the contents of which are incorporated herein in the entirety by references.

Some references, which may include patents, patent applications, and various publications, are cited and discussed in the description of the present disclosure. The citation and/or discussion of such references is provided merely to clarify the description of the present disclosure and is not an admission that any such reference is "prior art" to the present disclosure described herein. All references cited and discussed in this specification are incorporated herein by reference in their entireties and to the same extent as if each reference was individually incorporated by reference.

TECHNICAL FIELD

This disclosure relates to the field of artificial neural network technology, in particular to a self-adaptive threshold neuron information processing method, a self-adaptive leakage value neuron information processing method, system, computer device and readable storage media.

BACKGROUND OF THE PRESENT DISCLOSURE

Most of today's artificial neural network researches are still achieved in a Von Neumann computer software matched with a high-performance GPGPU (General Purpose Graphic Processing Units) platform, but the hardware overhead, energy consumption and information processing speed of the whole process are not optimistic. For this purpose, the neuromorphic computing field in recent years has developed rapidly, that is, hardware circuits are used to directly construct neural networks to simulate functions of the brain, so as to achieve a massively parallel, low-energy, computing platform that can support a complex learning mode.

However, in traditional neuromorphic systems, how to effectively balance issuance frequency of each pulse neuron in an whole neural network, so that each pulse neuron can play a role in processing information, for saving an overall cost of the neural network and improving an information processing efficiency, which is an urgent problem to be solved in traditional neural networks.

SUMMARY OF THE PRESENT DISCLOSURE

Based on this, it is necessary to provide a self-adaptive threshold neuron information processing method, a self-adaptive leakage value neuron information processing method, system, and computer device and readable storage medium for how to effectively balance the issue frequency of each pulse neuron in an entire neural network. The method comprises: receiving front end pulse neuron output information; reading current pulse neuron information; calculating current pulse nerve output information according to the front end pulse neuron output information and the current pulse neuron information; reading a current self-adaptive threshold variable and a threshold potential, and calculating a current self-adaptive threshold according to the current self-adaptive threshold variable and the threshold potential; judging whether the current pulse neuron output information is greater than or equal to the self-adaptive threshold, if yes, outputting the current pulse neuron output information, and updating the current self-adaptive threshold variable according to a first self-adaptive threshold update model, and if not, not outputting the current pulse neuron output information and updating the current self-adaptive threshold variable according to a second self-adaptive threshold update model.

In an embodiment, the front end pulse neuron output information includes: pulse tip information output by a front end pulse neuron, a connection weight index of a front end pulse neuron and a current pulse neuron; the current pulse neuron information includes: a current time window width, a pulse tip information sequence in a current time window, historical membrane potential information, and membrane potential leakage information; the calculating current pulse neuron output information according to the front end pulse neuron output information and the current pulse neuron information comprises: reading the connection weight of the front end pulse neuron and the current pulse neuron according to the connection weight index of the front end pulse neuron and the current pulse neuron; updating the pulse tip information sequence in the current time window according to the pulse tip information output by the front end pulse neuron and the pulse tip information sequence in the current time window, obtaining a pulse tip information updated sequence in the current time window; and calculating front end pulse neuron input information by an attenuation function according to the current time window width, the pulse tip information updated sequence in the current time window; calculating current pulse neuron output information by a pulse neuron calculation model according to the front end pulse neuron input information, the connection weight of the front end pulse neuron and the current pulse neuron, the historical membrane potential information, and the membrane potential leakage information.

In an embodiment, the outputting the current pulse neuron output information, and updating the current self-adaptive threshold variable according to a first self-adaptive threshold update model when the current pulse neuron output information is greater than or equal to the self-adaptive threshold, further comprises: determining issuance trigger flag information is issuance trigger, wherein the issuance trigger flag information comprises issuance trigger and issuance no trigger; resetting a refractory period timer, and updating the historical membrane potential information as preset reset membrane potential information.

In an embodiment, the not outputting the current pulse neuron output information, and updating the current self-adaptive threshold variable according to a second self-adaptive threshold update model, further comprises: determining the issuance trigger flag information is issuance no trigger; reading a refractory period width and a current time step of a refractory period timer; according to the refractory period width and the current time step of the refractory period timer, judging whether current time is in a refractory period, if current time is in the refractory period, cumulatively timing the refractory period timer one time step, not updating the historical membrane potential information; if current time is not in the refractory period, cumulatively timing the refractory period timer one time step, and updating the historical membrane potential information as current pulse neuron output information.

In an embodiment, the reading a current self-adaptive threshold variable and a threshold potential, and calculating a current self-adaptive threshold according to the current self-adaptive threshold variable and the threshold potential, comprises: reading a random threshold mask potential, a threshold offset, a current self-adaptive threshold variable and a random threshold; performing a bitwise AND operation on the random threshold and the random threshold mask potential to obtain a threshold random superposition amount; determining the threshold potential according to the threshold random superposition amount and the threshold offset; determining the current self-adaptive threshold according to the threshold potential and the current self-adaptive threshold variable.

In an embodiment, the updating the current self-adaptive threshold variable according to a first self-adaptive threshold update model comprises: reading an issuance threshold increment and a current self-adaptive threshold variable; calculating a first threshold according to a preset attenuation constant and the current self-adaptive threshold variable; superposing the issuance threshold increment to the first threshold to obtain a second threshold; updating the current self-adaptive threshold variable according to the second threshold.

In an embodiment, the updating the current self-adaptive threshold variable according to a second self-adaptive threshold update model comprises: reading the current self-adaptive threshold variable; calculating a third threshold according to the preset attenuation constant and the current self-adaptive threshold variable, updating the current self-adaptive threshold variable according to the third threshold.

In an embodiment, the outputting the current pulse neuron output information, comprises: reading an issuance enablement identifier, and the issuance enablement identifier comprises allowance of issuing data or no allowance of issuing data; when the issuance enablement identifier is allowance of issuing data, reading the issuance trigger flag information, when the issuance trigger flag information is issuance trigger; outputting the current pulse neuron output information.

The self-adaptive threshold neuron information processing method provided by the present disclosure calculates a current self-adaptive threshold by reading a current self-adaptive threshold variable and a threshold potential in the calculation of current pulse neuron output information; and determinates whether to output current pulse neuron output information according to a current self-adaptive threshold, and determines updating a current self-adaptive variable model. The self-adaptive threshold neuron information processing method provided by the present disclosure can increase the threshold of the neuron that currently issues output information, and the difficulty of next issuance rises; while decreases the threshold of the neuron that currently does not issue output information, and the difficulty of next issuance reduces. The issue frequency of each neuron in an entire network is effectively balanced, so that each neuron can play a role in processing information, for saving an overall cost of a neural network, improving an information processing efficiency, and greatly improving the pulse neural network information processing capability.

In an embodiment, the updating the pulse tip information sequence in the current time window according to the pulse tip information output by the front end pulse neuron and the pulse tip information sequence in the current time window to obtain the pulse tip information updated sequence in the current time window, calculating front end pulse neuron input information by an attenuation function according to the current time window width, and the connection weight of the front end pulse neuron and the current pulse neuron, can support a space-time pulse neural network model with a time depth, in contrast to a neural network technical solution with the time depth only being one, and can greatly improve the space-time information coding ability of a pulse neural network and enrich the application space of a pulse neural network.

In an embodiment, the threshold potential is determined by reading a random threshold mask potential and a threshold offset and receiving a configuration value given by a configuration register, so that a neuron issues pulse tip information with a certain probability of randomness, regardless of whether a membrane potential exceeds a fixed threshold offset, and because there is a positive or negative threshold random superposition amount, a neuron cell body may issue pulses, which improves the calculation ability and information processing capability of a pulse neural network model.

In an embodiment, by setting an issuance enablement identifier and an issuance trigger flag to determine the current pulse neuron output information, so that the output of the pulse neuron is more controllable, and the issuance enablement identifier can be configured with that some neurons are not allowed to issue date and only used as an intermediate auxiliary computing neuron, this is very necessary for some functions that require multiple neurons to achieve by cooperation.

A self-adaptive leakage value neuron information processing method and system, wherein the method includes: receiving front end pulse neuron output information; reading the current pulse neuron information, wherein the current pulse neuron information includes self-adaptive membrane potential leakage information; calculating current pulse neuron output information according to the front end pulse neuron output information and the current pulse neuron information; updating the self-adaptive membrane potential leakage information according to the current pulse neuron output information; outputting the current pulse neuron output information.

In an embodiment, the front end pulse neuron output information comprises: pulse tip information output by the front end pulse neuron, a connection weight index of a front end neuron and a current neuron; the current pulse neuron information, also comprises: a current time window width, a pulse tip information sequence in a current time window, and historical membrane potential information; and the calculating current pulse neuron output information according to the front end pulse neuron output information and the current pulse neuron information, comprises: reading the connection weight of the front end neuron and the current neuron according to the connection weight index of the front end neuron and the current neuron; updating the pulse tip information sequence in the current time window according to the pulse tip information output by the front end pulse neuron and the pulse tip information sequence in the current time window, to obtain a pulse tip information updated sequence in the current time window; calculating front end pulse neuron input information by an attenuation function according to the current time window width and the pulse tip information updated sequence in the current time window; calculating current pulse neuron output information by a pulse neuron calculation model according to the front end pulse neuron input information, the connection weight of the front end pulse neuron and the current pulse neuron, the historical membrane potential information and the membrane potential leakage information.

In an embodiment, after the calculating current pulse neuron output information according to the front end pulse neuron output information and the current pulse neuron information, before the outputting the current pulse neuron output information, the method further comprises: obtaining a threshold potential; comparing the current pulse neuron output information with the threshold potential, and determining issuance trigger flag information according to a comparison result, wherein the issuance trigger flag information includes: issuance trigger or issuance no trigger; resetting a refractory period timer and updating the historical membrane potential information as preset reset membrane potential information, when the issuance trigger flag information is issuance trigger.

In an embodiment, the method further comprises: reading a refractory period width and a current time step of a refractory period timer when the issuance trigger flag information is issuance no trigger; judging whether current time is in the refractory period according to the refractory period width and the current time step of the refractory period timer, if current time is in the refractory period, cumulatively timing the refractory period timer one time step, not updating the historical membrane potential information; if current time is not in the response period, cumulatively timing the refractory period timer one time step, and updating the historical membrane potential information as the current pulse neuron output information.

In an embodiment, the obtaining a threshold potential includes: reading a random threshold mask potential, a threshold offset, and a random threshold; performing a bitwise AND operation on the random threshold and the random threshold mask potential to obtain a threshold random superposition amount; determining the threshold potential according to the threshold random superposition amount and the threshold offset.

In an embodiment, the updating the self-adaptive membrane potential leakage information according to the current pulse neuron output information, comprises: reading resting membrane potential information and a leakage value scaling factor; updating the self-adaptive membrane potential leakage information according to the resting membrane potential information, the leakage value scaling factor and the current pulse neuron output information.

In an embodiment, the outputting the current pulse neuron output information comprises: reading an issuance enablement identifier, wherein the issuance enablement identifier includes allowance of issuing data or no allowance of issuing data; reading the issuance trigger flag information when the issuance enablement identifier is allowance of issuing data; outputting the current pulse neuron output information is when the issuance trigger flag information is issuance trigger.

The self-adaptive leakage value neuron information processing system provided by the present disclosure utilizes self-adaptive membrane potential leakage information to participate in calculation of current pulse neuron output information, and utilizes the calculated current pulse neuron output information to update the self-adaptive membrane potential information to participate in calculation of a next time step. Different from the traditional fixed leakage value, a set manner of a self-adaptive leakage value, and a leakage value of each time step are related to a membrane potential of a previous time step, so that a neural network has certain flexibility, if a membrane potential of a current time step is big, a leakage value of a next time step is much attenuated, if the membrane potential of the current time step is small, a leakage value of a next time step is less attenuated, and the pulse neuron losing response capability caused by the attenuation of a leakage value to the end will not occur and no excessive sensitivity to the input response caused by the too slow attenuation of the leakage value will appear, and a good balance between the sensitivity and stability of the neural network is achieved.

In an embodiment, updating the pulse tip information sequence in the current time window according to the pulse tip information output by the front end pulse neuron and the pulse tip information sequence in the current time window to obtain the pulse tip information updated sequence in the current time window, calculating front end pulse neuron input information by an attenuation function according to the current time window width, and the connection weight of the front end pulse neuron and the current pulse neuron, can support a space-time pulse neural network model with a time depth, in contrast to a neural network technical solution with the time depth only being one, and can greatly improve the space-time information coding ability of a pulse neural network and enrich the application space of a pulse neural network.

In an embodiment, by setting an issuance enablement identifier and an issuance trigger flag to determine the current pulse neuron output information, so that the output of the pulse neuron is more controllable, and the issuance enablement identifier can be configured with that some neurons are not allowed to issue date and only used as an intermediate auxiliary computing neuron, this is very necessary for some functions that require multiple neurons to achieve by cooperation.

In an embodiment, the threshold potential is determined by reading a random threshold mask potential and a threshold offset and receiving a configuration value given by a configuration register, so that a neuron issues pulse tip information with a certain probability of randomness.

In an embodiment, by setting a leakage value scaling factor, the neuron self-adaptive leakage value is more controllable, and the balance between sensitivity and stability of a neural network is further improved.

This disclosure also provides a self-adaptive leakage value neuron information processing system, comprising: a front end pulse neuron output information receiving module, used for receiving front end pulse neuron output information; and a current pulse neuron information reading module, used for reading current pulse neuron information, the current pulse neuron information includes self-adaptive membrane potential leakage information; a current pulse neuron output information calculating module, used for calculating current pulse neuron output information according to the front end pulse neuron output information and the current pulse neuron information; a self-adaptive membrane potential leakage information updating module, used for updating the self-adaptive membrane potential leakage information according to the current pulse neuron output information; and a current pulse neuron information outputting module, used for outputting the current pulse neuron output information.

The disclosure also provides a computing system comprising a processor, a memory, and computer instructions stored on the memory, the computer instructions, steps in the method in each one of above embodiments are achieved when the computer instructions are executed by the processor.

The present disclosure also provides a readable storage medium comprising computer instructions that, when the computer instructions are executed by the processor, steps in the method in each one of above embodiments are achieved.

BRIEF DESCRIPTION OF THE DRAWINGS

The accompanying drawings illustrate one or more embodiments of the present disclosure and, together with the written description, serve to explain the principles of the invention. Wherever possible, the same reference numbers are used throughout the drawings to refer to the same or like elements of an embodiment.

Figure 1:
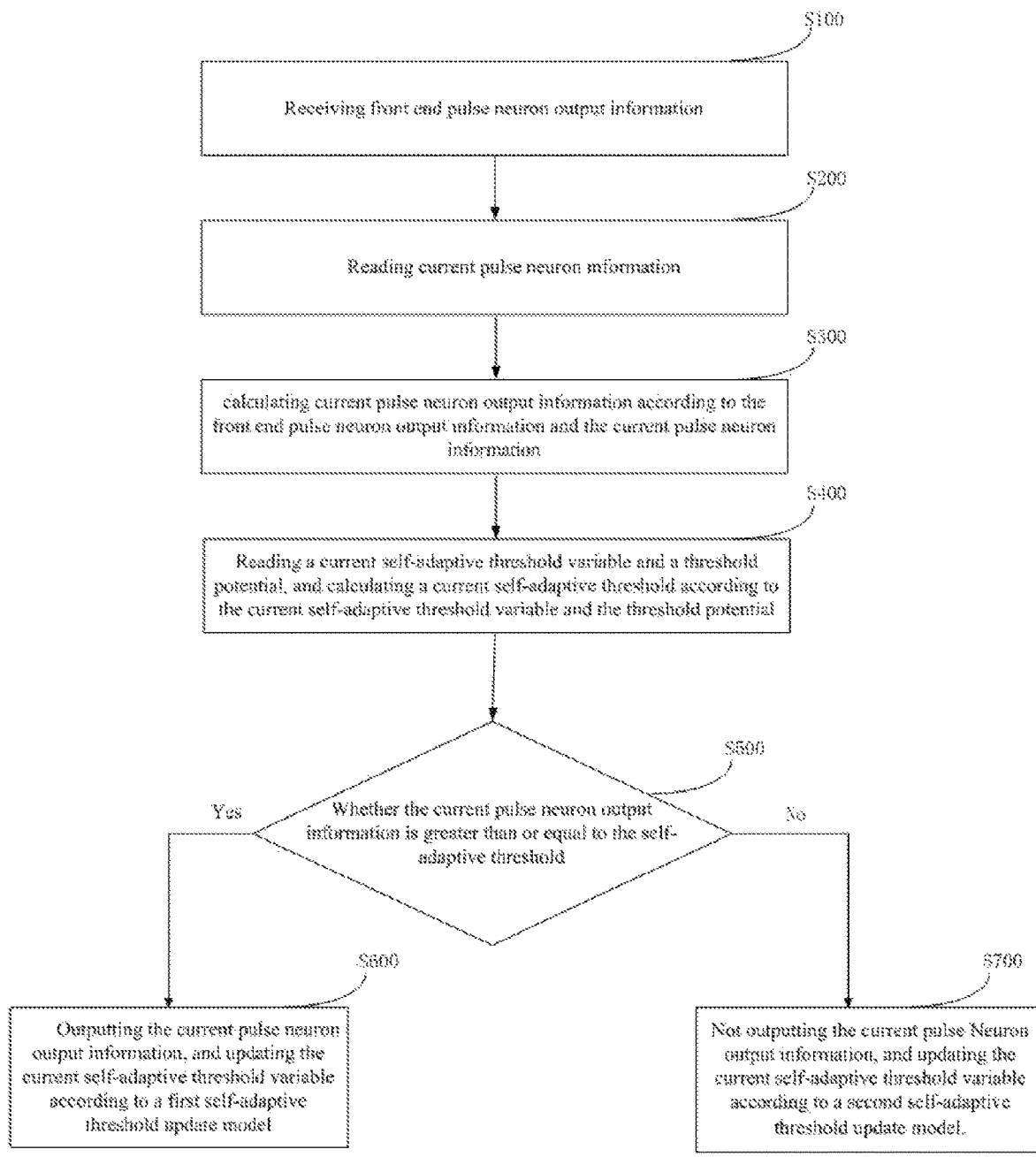
FIG. 1 is a schematic flow chart of a self-adaptive threshold neural network information processing method according to an embodiment.

The numerals are described as below:

For FIG. 1: S100: Receiving front end pulse neuron output information; S200: Reading current pulse neuron information; S300: calculating current pulse neuron output information according to the front end pulse neuron output information and the current pulse neuron information; S400: Reading a current self-adaptive threshold variable and a threshold potential, and calculating a current self-adaptive threshold according to the current self-adaptive threshold variable and the threshold potential; S500: Whether the current pulse neuron output information is greater than or equal to the self-adaptive threshold; Yes S600: Outputting the current pulse neuron output information, and updating the current self-adaptive threshold variable according to a first self-adaptive threshold update model; No S700: Not outputting the current pulse neuron output information, and updating the current self-adaptive threshold variable according to a second self-adaptive threshold update model.

Figure 2:
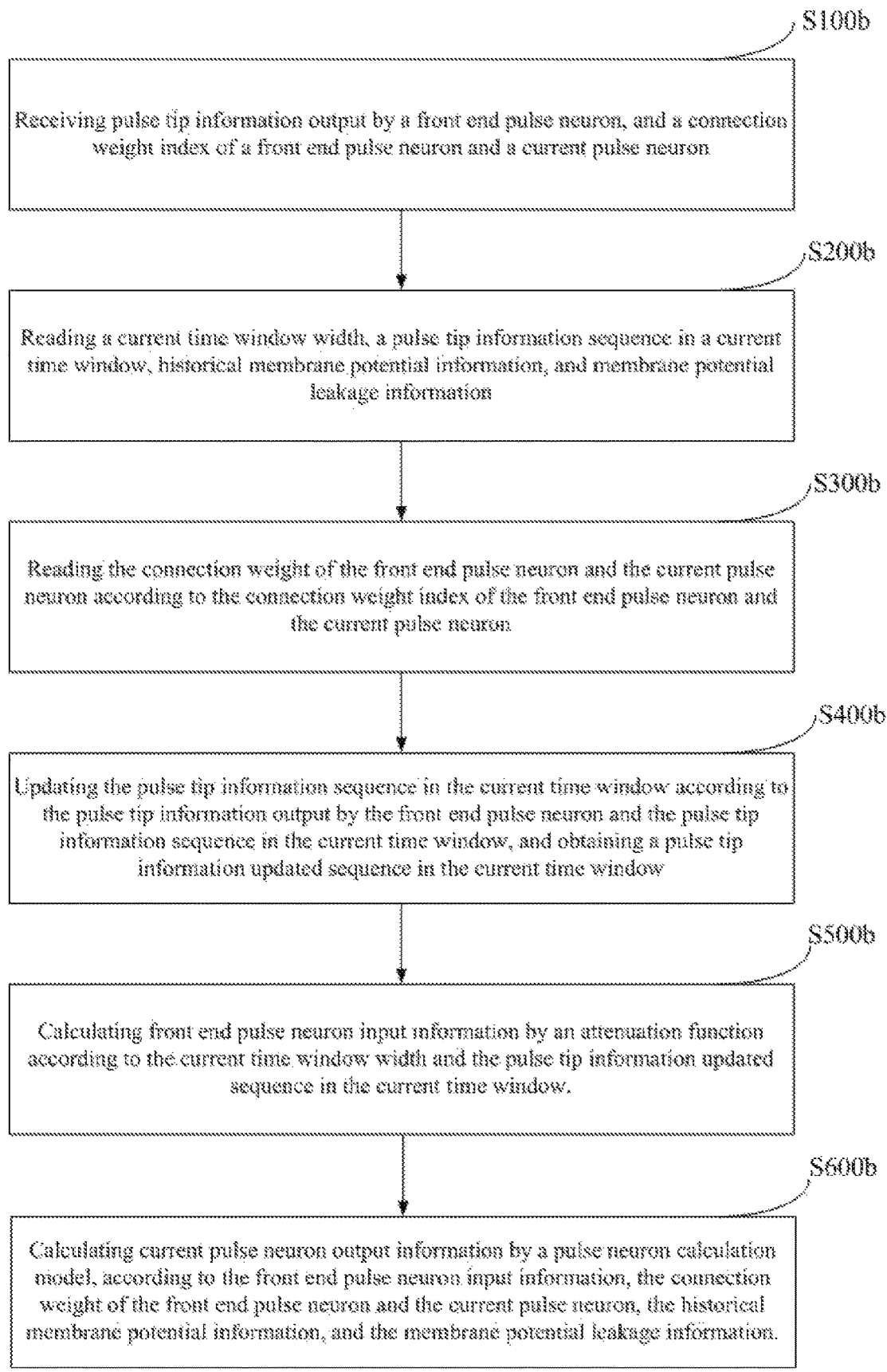
FIG. 2 is a schematic flow chart of a self-adaptive threshold neural network information processing method according to another embodiment.

For FIG. 2, S100b: Receiving pulse tip information output by a front end pulse neuron, and a connection weight index of a front end pulse neuron and a current pulse neuron; S200b: Reading a current time window width, a pulse tip information sequence in a current time window, historical membrane potential information, and membrane potential leakage information; S300b; Reading the connection weight of the front end pulse neuron and the current pulse neuron according to the connection weight index of the front end pulse neuron and the current pulse neuron; S400b: Updating the pulse tip information sequence in the current time window according to the pulse tip information output by the front end pulse neuron and the pulse tip information sequence in the current time window, and obtaining a pulse tip information updated sequence in the current time window; S500b: Calculating front end pulse neuron input information by an attenuation function according to the current time window width and the pulse tip information updated sequence in the current time window; S600b: Calculating current pulse neuron output information by a pulse neuron calculation model, according to the front end pulse neuron input information, the connection weight of the front end pulse neuron and the current pulse neuron, the historical membrane potential information, and the membrane potential leakage information.

Figure 3:
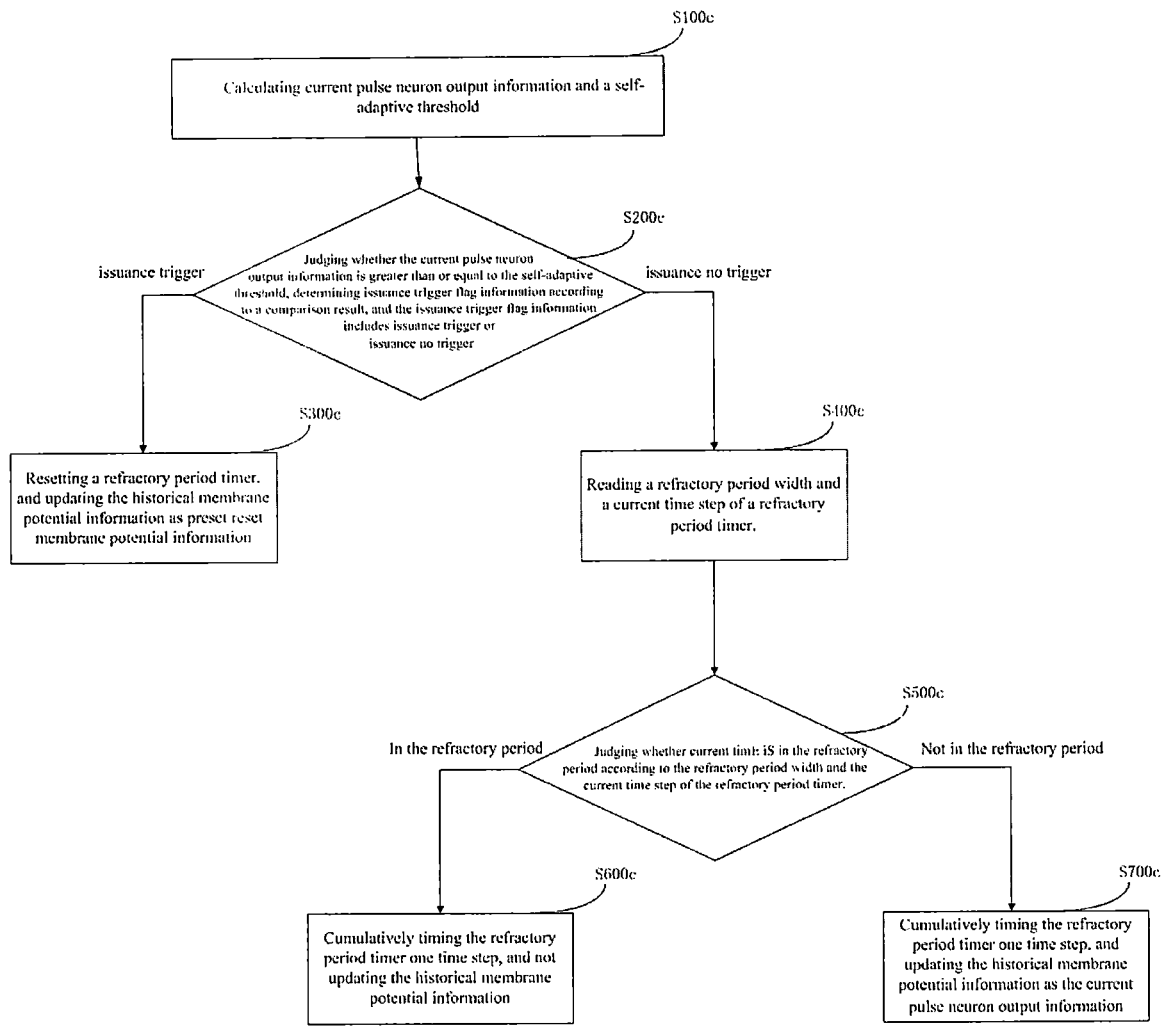
FIG. 3 is a schematic flow chart of a self-adaptive threshold neural network information processing method according to still another embodiment.

For FIG. 3, S100c: Calculating current pulse neuron output information and a self-adaptive threshold; S200c: Judging whether the current pulse neuron output information is greater than or equal to the self-adaptive threshold, determining issuance trigger flag information according to a comparison result, and the issuance trigger flag information includes issuance trigger or issuance no trigger; for issuance trigger S300c: Resetting a refractory period timer, and updating the historical membrane potential information as preset reset membrane potential information; for issuance no trigger, S400c: Reading a refractory period width and a current time step of a refractory period timer; and S500c: Judging whether current time is in the refractory period according to the refractory period width and the current time step of the refractory period timer. In the refractory period, S600c: Cumulatively timing the refractory period timer one time step, and not updating the historical membrane potential information; Not in the refractory period, S700c: Cumulatively timing the refractory period timer one time step, and updating the historical membrane potential information as the current pulse neuron output information For FIG. 4, S410: Reading a random threshold mask potential, a threshold offset, a current self-adaptive threshold variable, and a random threshold; S420: Performing a bitwise AND operation on the random threshold and the random threshold mask potential to obtain a threshold random superposition amount; S430: Determining the threshold potential according to the threshold random superposition amount and the threshold offset; S440: Determining the current self-adaptive threshold according to the threshold potential and the current self-adaptive threshold variable.

Figure 5:
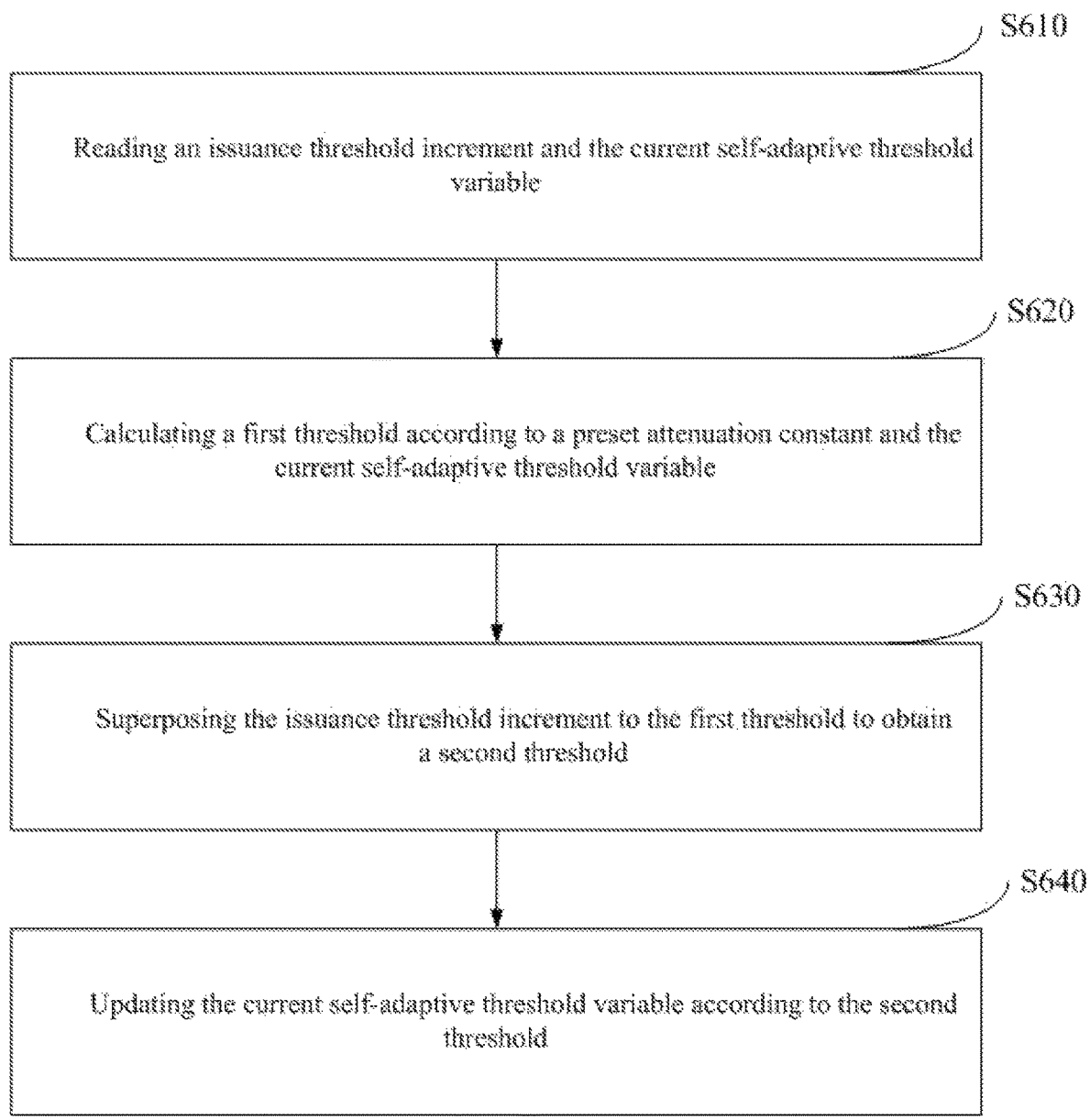
FIG. 5 is a schematic flow chart of a self-adaptive threshold neural network information processing method according to yet another embodiment.

For FIG. 5, S610: Reading an issuance threshold increment and the current self-adaptive threshold variable; S620: Calculating a first threshold according to a preset attenuation constant and the current self-adaptive threshold variable; S630: Superposing the issuance threshold increment to the first threshold to obtain a second threshold; and S640: Updating the current self-adaptive threshold variable according to the second threshold.

Figure 6:
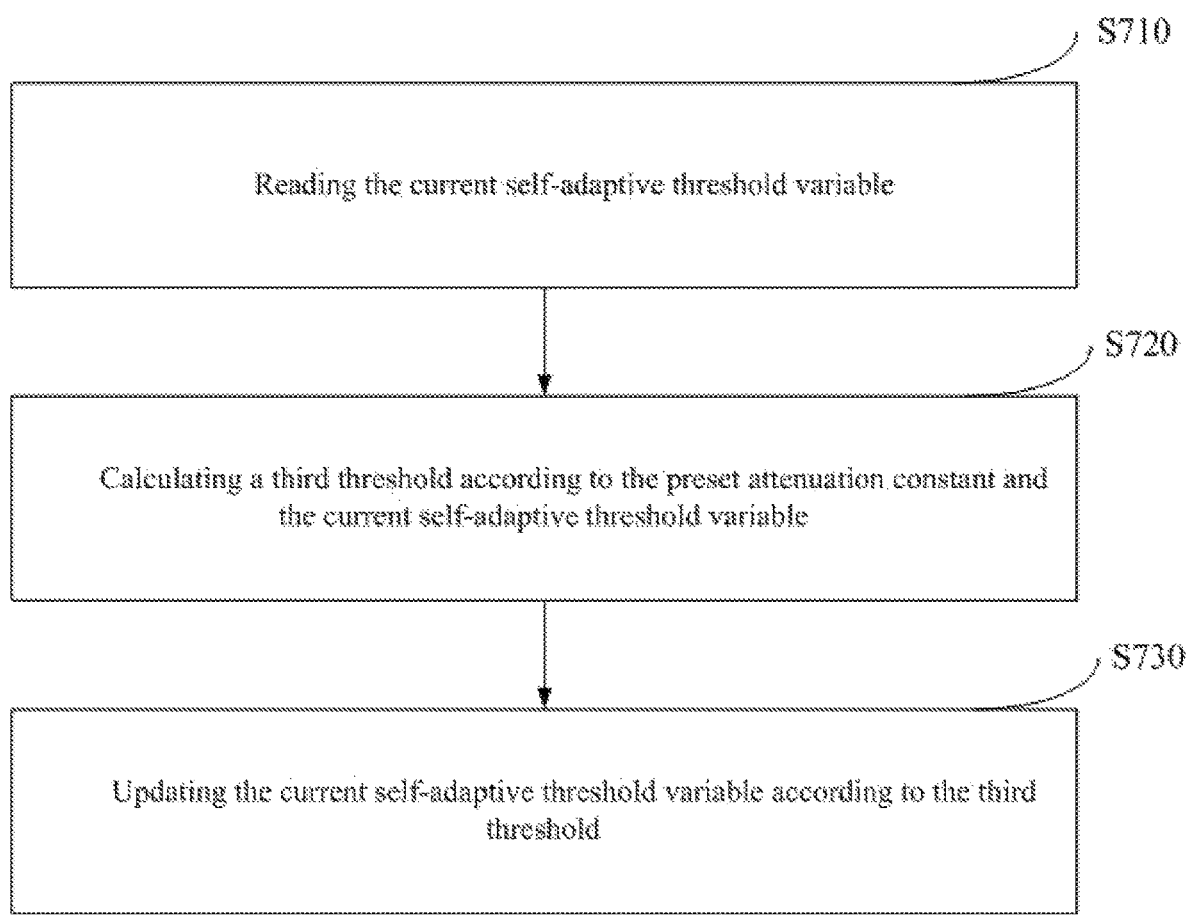
FIG. 6 is a schematic flow chart of a self-adaptive threshold neural network information processing method according to yet another embodiment.

For FIG. 6, S710: Reading the current self-adaptive threshold variable; S720; Calculating a third threshold according to the preset attenuation constant and the current self-adaptive threshold variable; and S730: Updating the current self-adaptive threshold variable according to the third threshold.

Figure 7:
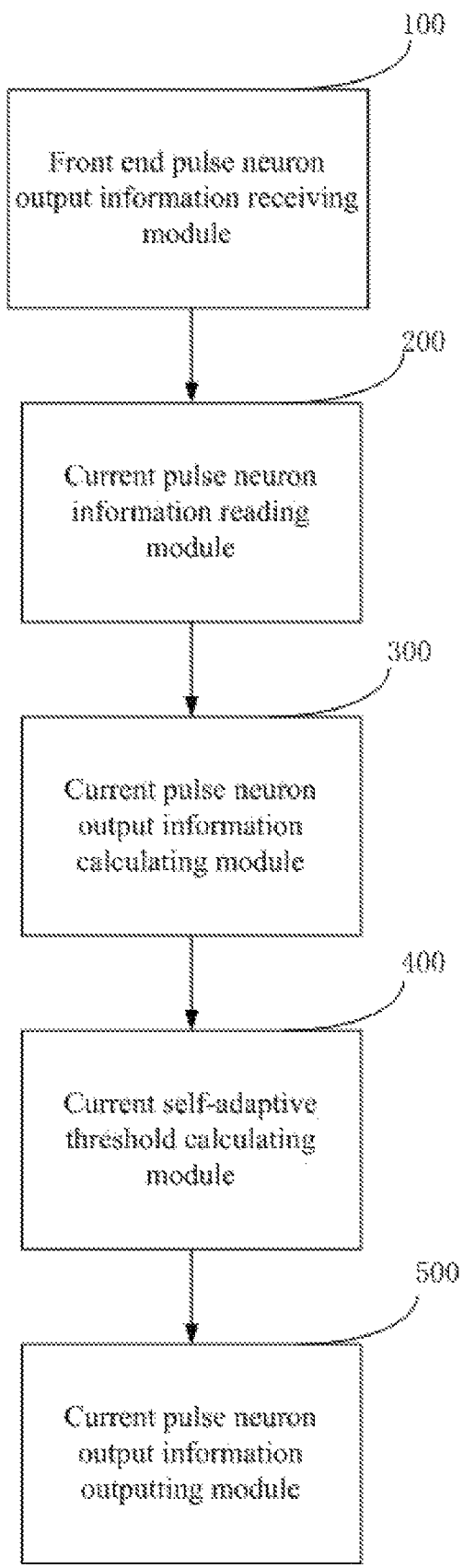
FIG. 7 is a schematic structural diagram of a self-adaptive threshold neural network information processing system according to an embodiment.

For FIG. 7, 100: Front end pulse neuron output information receiving module; 200: Current pulse neuron information reading module; 300: Current pulse neuron output information calculating module; 400: Current self-adaptive threshold calculating module; and 500: Current pulse neuron output information outputting module.

Figure 8:
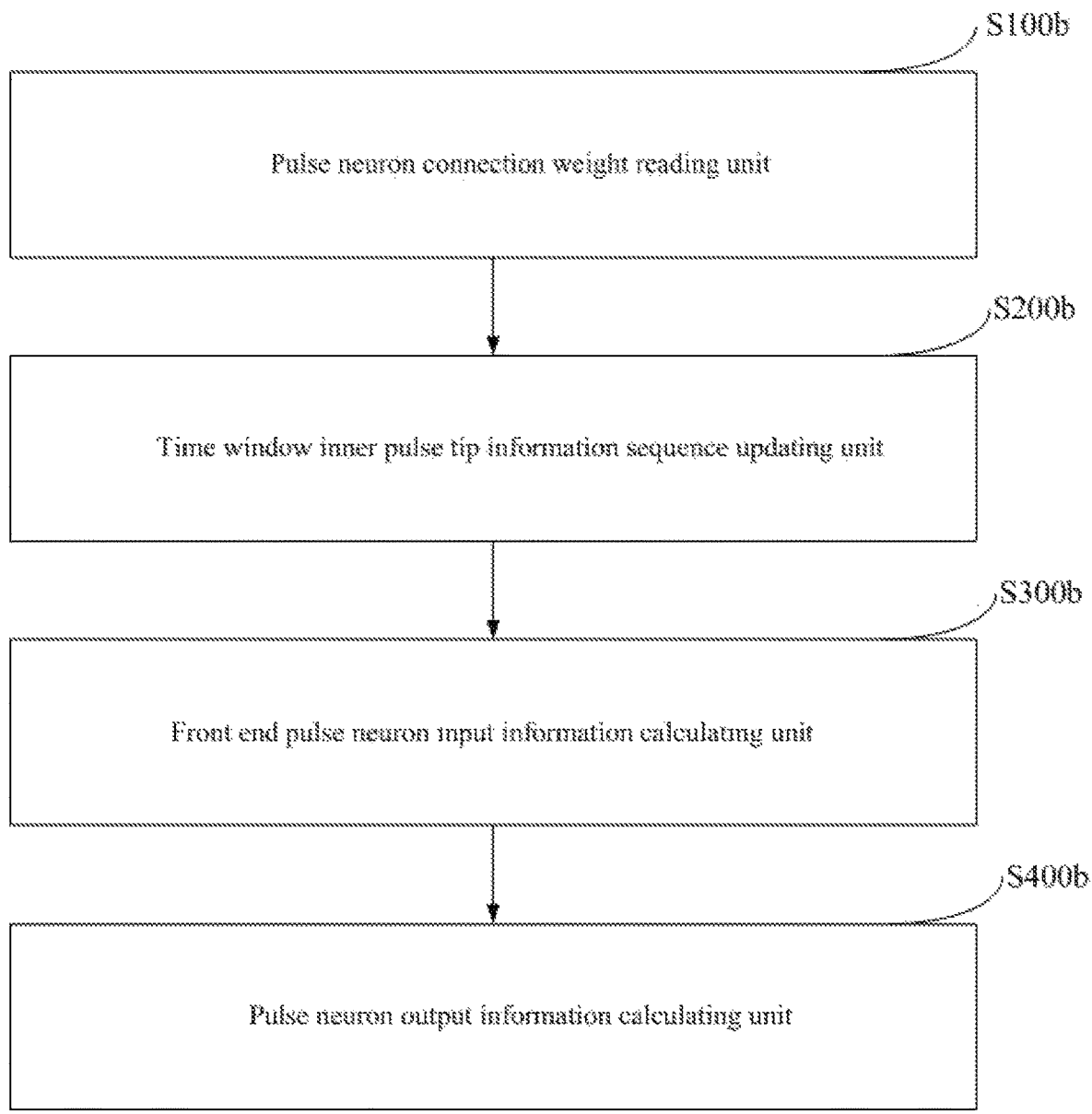
FIG. 8 is a schematic structural diagram of a self-adaptive threshold neural network information processing system according to another embodiment.

For FIG. 8, 100$b$: Pulse neuron connection weight reading unit; 200$b$: Time window inner pulse tip information sequence updating unit; 300$b$: Front end pulse neuron input information calculating unit; and 400$b$: Pulse neuron output information calculating unit.

Figure 9:
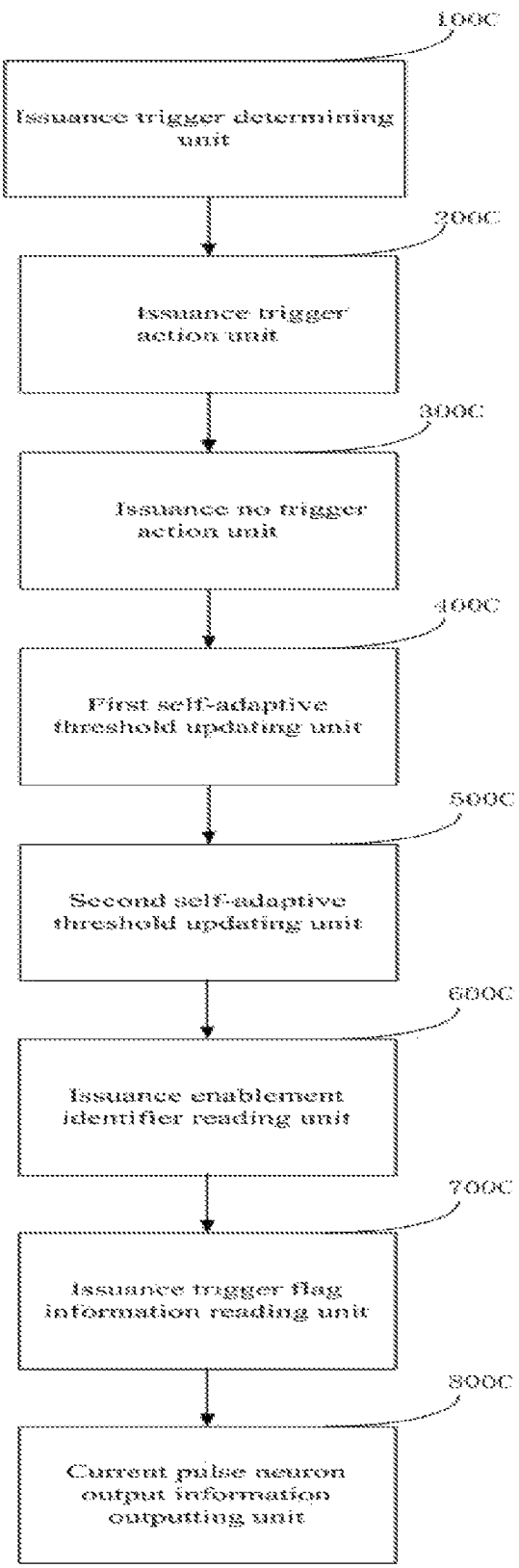
FIG. 9 is a schematic structural diagram of a self-adaptive threshold neural network information processing system according to still another embodiment.

For FIG. 9, 100$c$: Issuance trigger determining unit; 200$c$: Issuance trigger action unit; 300$c$: Issuance no trigger action unit; 400$c$: First self-adaptive threshold updating unit; 500$c$: Second self-adaptive threshold updating unit; 600$c$: issuance enablement identifier reading unit; 700$c$: Issuance trigger flag information reading unit; and 800$c$: Current pulse neuron output information outputting unit.

Figure 10:
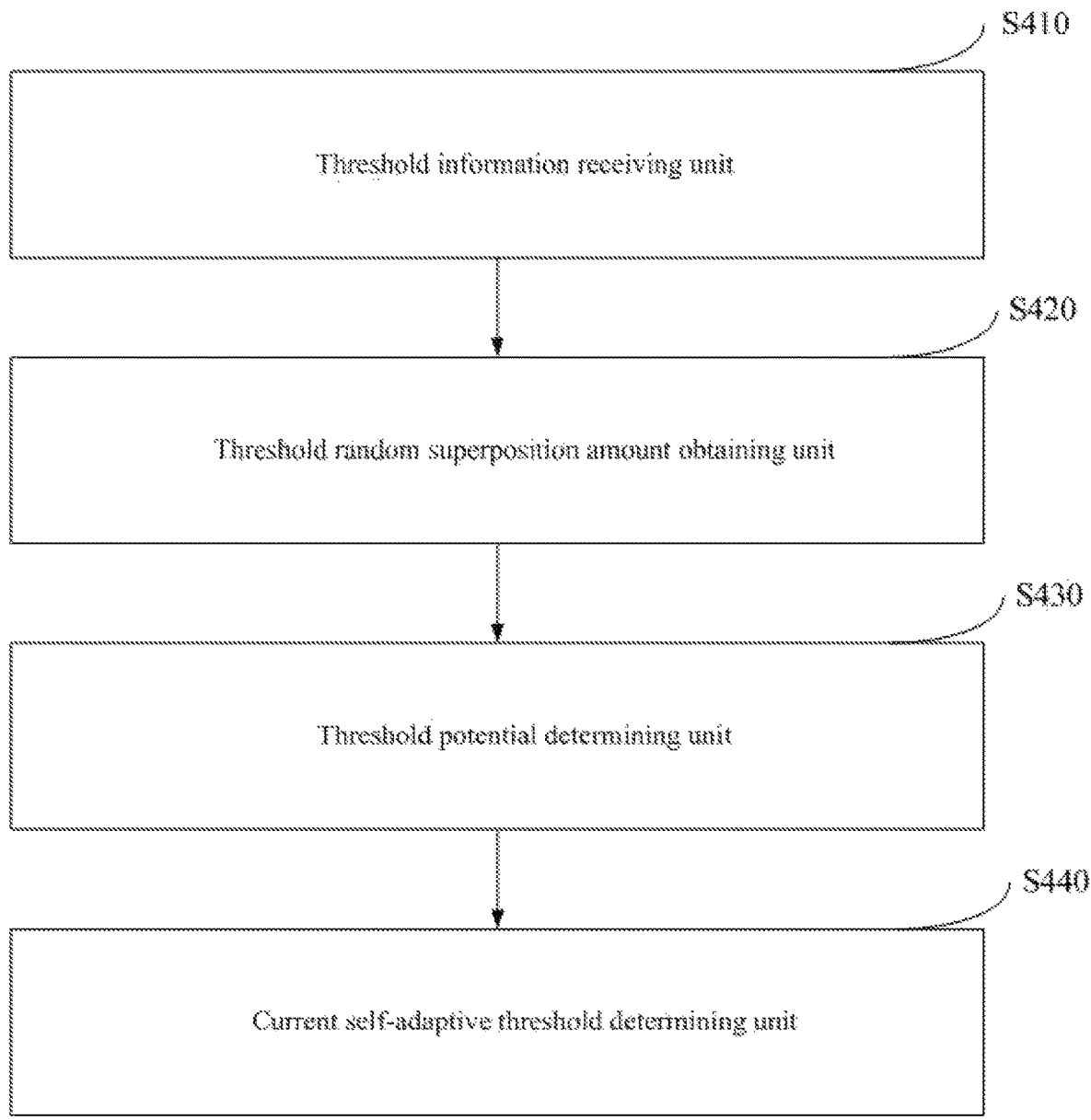
FIG. 10 is a schematic structural diagram of a self-adaptive threshold neural network information processing system according to yet another embodiment.
Figure 11:
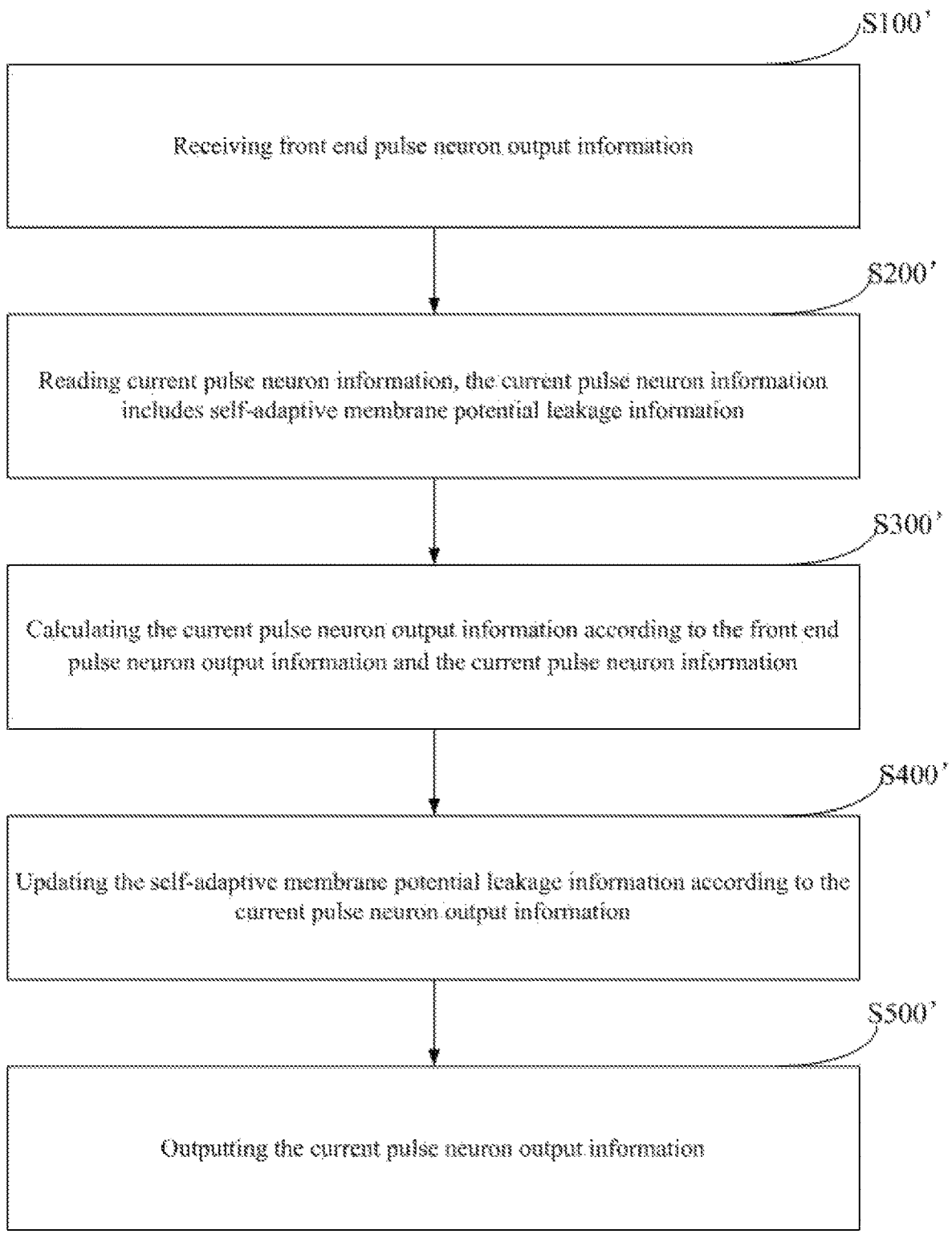
FIG. 11 is a schematic flow chart of a self-adaptive leakage value neural network information processing method according to an embodiment.

For FIG. 10, 410: Threshold information receiving unit; 420: Threshold random superposition amount obtaining unit; 430: Threshold potential determining unit; 440: Current self-adaptive threshold determining unit;

For FIG. 11, S100': Receiving front end pulse neuron output information; S200': Reading current pulse neuron information, the current pulse neuron information includes self-adaptive membrane potential leakage information; S300': Calculating the current pulse neuron output information according to the front end pulse neuron output information and the current pulse neuron information; S400': Updating the self-adaptive membrane potential leakage information according to the current pulse neuron output information; and S500' Outputting the current pulse neuron output information; For FIG. 12, S100$b$': Receiving front end pulse neuron output information, a connection weight index of a front end neuron and a current neuron; S200$b$': Reading a current time window width, a pulse tip information sequence in a current time window, historical membrane potential information, and self-adaptive membrane potential leakage information; S300$b$': Reading the connection weight of the front end neuron and the current neuron according to the connection weight index of the front end neuron and the current neuron; S400$b$': Updating the pulse tip information sequence in the current time window according to the pulse tip information output by the front end pulse neuron and the pulse tip information sequence in the current time window, to obtain the pulse tip information updated sequence in the current time window; S500$b$': Calculating front end pulse neuron input information by an attenuation function according to the current time window width and the pulse tip information updated sequence in the current time window; and S600$b$': Calculating current pulse neuron output information by a pulse neuron calculation model, according to the front end pulse neuron input information, the connection weight of the front end pulse neuron and the current pulse neuron, the historical membrane potential information, and the self-adaptive membrane potential leakage information.

Figure 13:
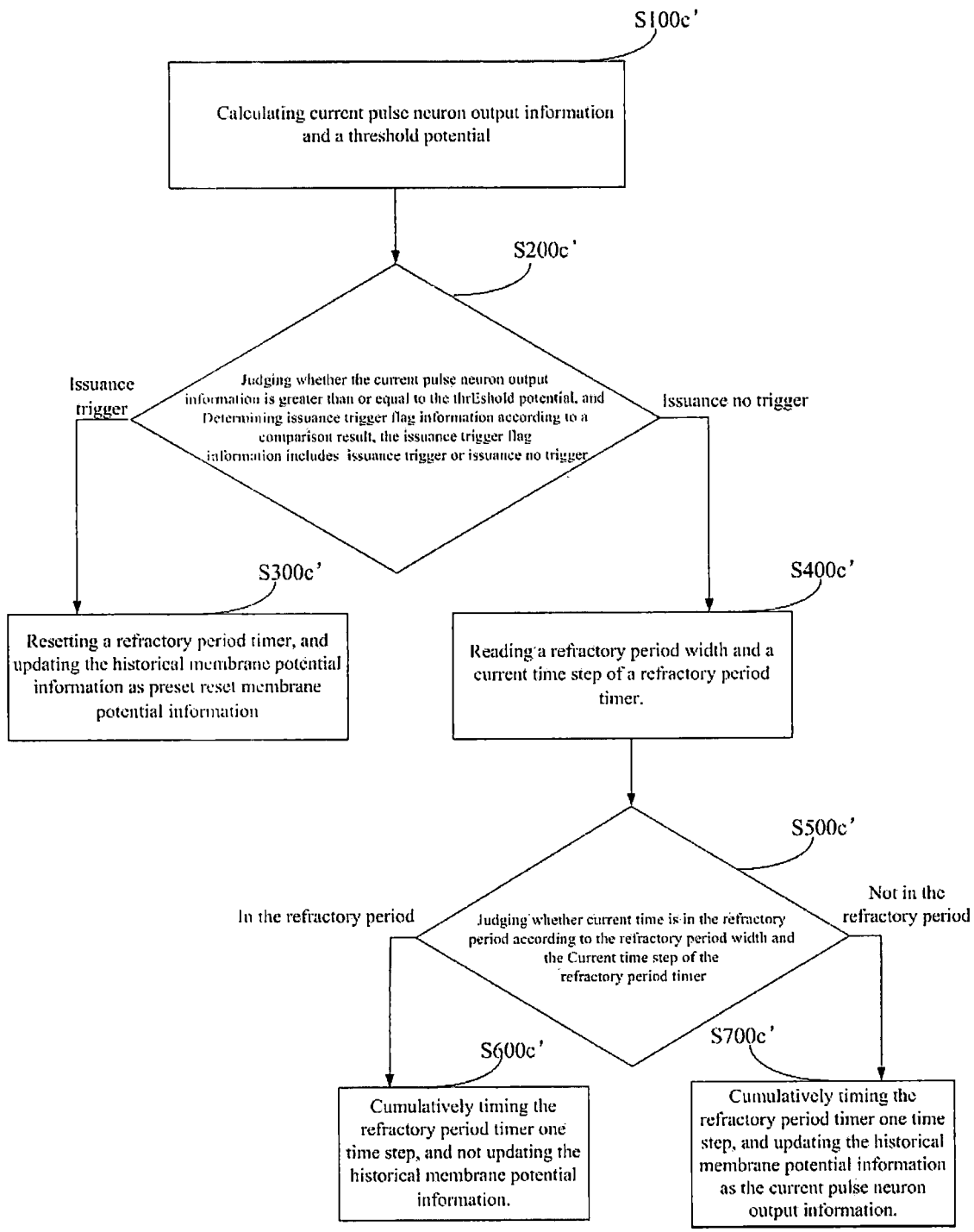
FIG. 13 is a schematic flow chart of a self-adaptive leakage value neural network information processing method according to still another embodiment.

For FIG. 13, S100$c$': Calculating current pulse neuron output information and a threshold potential; S200$c$': Judging whether the current pulse neuron output information is greater than or equal to the threshold potential, and determining issuance trigger flag information according to a comparison result, the issuance trigger flag information includes issuance trigger or issuance no trigger; Issuance trigger, S300$c$': Resetting a refractory period timer, and updating the historical membrane potential information as preset reset membrane potential information; Issuance no trigger, S400$c$': Reading a refractory period width and a current time step of a refractory period timer; S500$c$': Judging whether current time is in the refractory period according to the refractory period width and the current time step of the refractory period timer; In the refractory period, S600$c$': Cumulatively timing the refractory period timer one time step, and not updating the historical membrane potential information; Not in the refractory period, S700$c$': Cumulatively timing the refractory period timer one time step, and updating the historical membrane potential information as the current pulse neuron output information.

Figure 14:
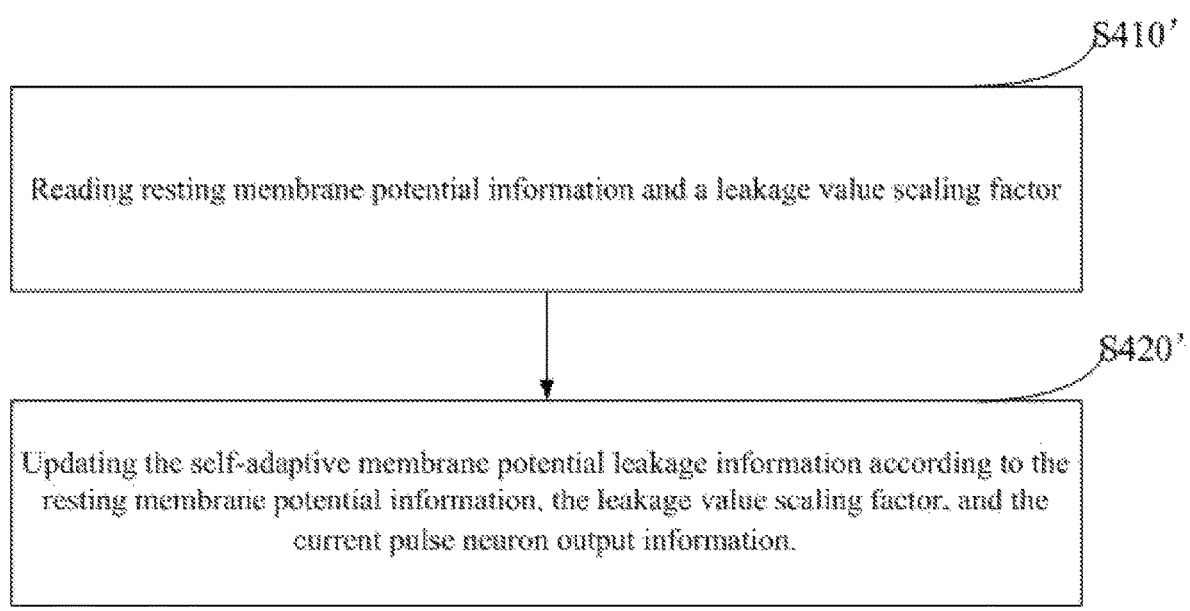
FIG. 14 is a schematic flow chart of a self-adaptive leakage value neural network information processing method according to yet another embodiment.

For FIG. 14, S410': Reading resting membrane potential information and a leakage value scaling factor; S420': Updating the self-adaptive membrane potential leakage information according to the resting membrane potential information, the leakage value scaling factor, and the current pulse neuron output information.

Figure 15:
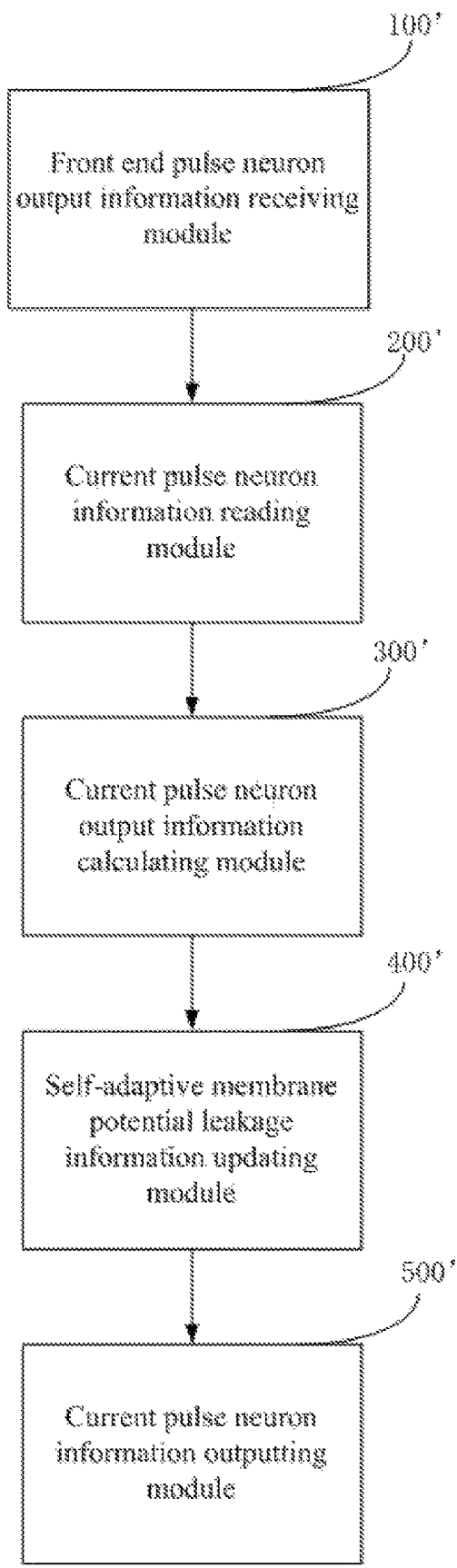
FIG. 15 is a schematic structural diagram of a self-adaptive leakage value neural network information processing system according to an embodiment.

For FIG. 15, 100': Front end pulse neuron output information receiving module; 200': Current pulse neuron information reading module; 300': Current pulse neuron output information calculating module; 400': Self-adaptive membrane potential leakage information updating module; and 500': Current pulse neuron information outputting module.

Figure 16:
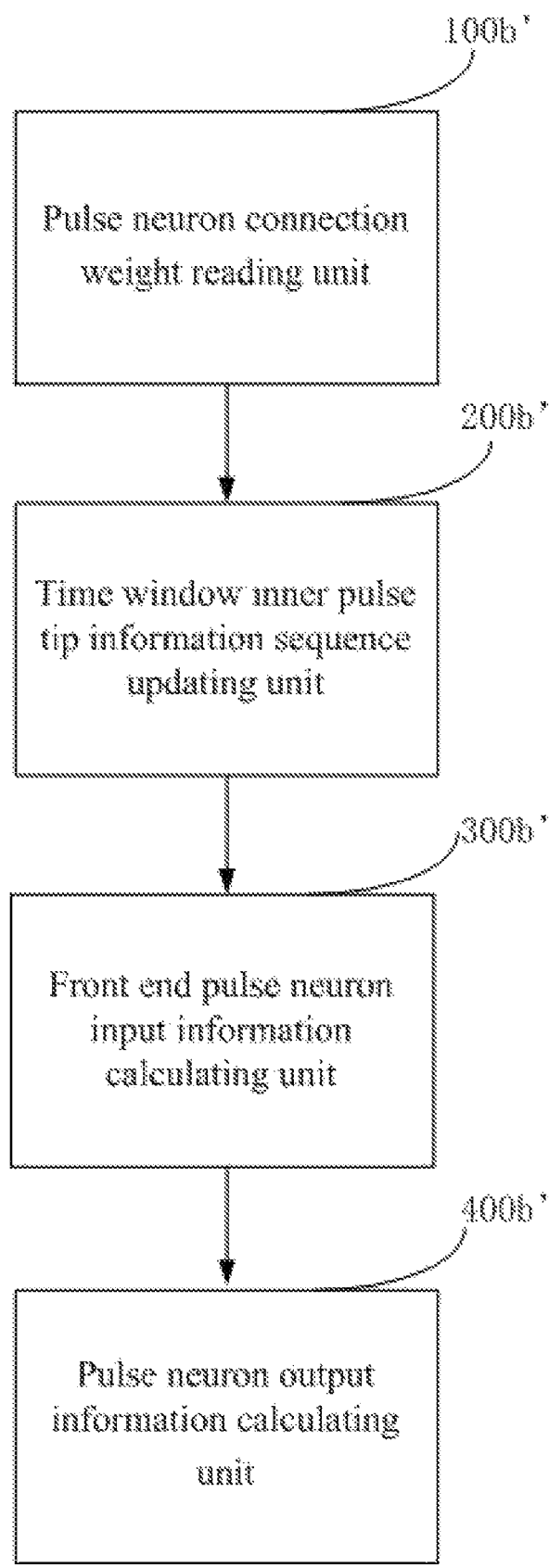
FIG. 16 is a schematic structural diagram of a self-adaptive leakage value neural network information processing system according to another embodiment.

For FIG. 16, 100$b$': Pulse neuron connection weight reading unit; 200$b$': Time window inner pulse tip information sequence updating unit; 300$b$': Front end pulse neuron input information calculating unit; and 400$b$': Pulse neuron output information calculating unit.

Figure 17:
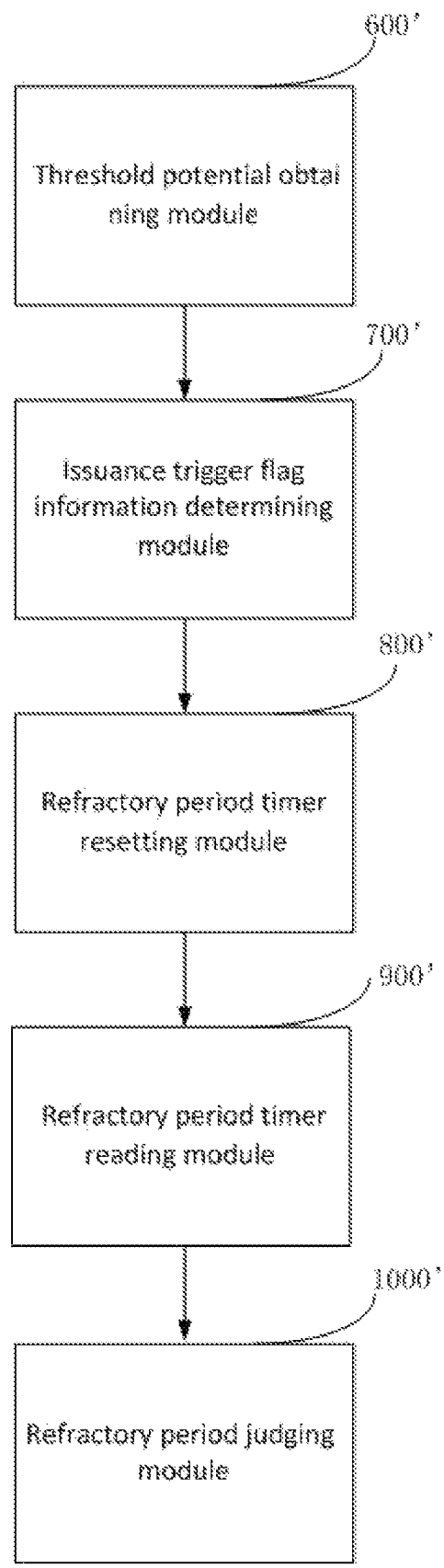
FIG. 17 is a schematic structural diagram of a self-adaptive leakage value neural network information processing system according to still another embodiment.

For FIG. 17, 600': Threshold potential obtaining module; 700': Issuance trigger flag information determining module; 800': Refractory period timer resetting module; 900': Refractory period timer reading module; and 1000': Refractory period judging module.

DETAILED DESCRIPTION OF EMBODIMENTS

In order to make the purpose, technical solution and advantage of the present disclosure more clear and explicit, the disclosure is further described in details below by combining drawings and embodiments.

It should be understood that the specific embodiments described herein are merely used to explain the present disclosure and are not intended to limit the present disclosure.

FIG. 1 is a schematic flow chart of a self-adaptive threshold neural network information processing method of an embodiment, and the self-adaptive threshold neural network information processing method as shown in FIG. 1 comprises:

Step S100, receiving front end pulse neuron output information. Specifically, the front end pulse neuron output information is a pulse information output by a pulse neuron of a front end connected with a current pulse neuron.

Step S200, reading current pulse neuron information. Specifically, the current pulse neuron information includes a historical pulse information sequence sent by a front end pulse neuron stored by a current neuron, and the like.

Step S300, calculating current pulse neuron output information according to the front end pulse neuron output information and the current pulse neuron information. Specifically, a current pulse neuron calculates the current pulse neuron output information according to the received pulse information output by the front end pulse neuron and the read current pulse neuron information.

Step S400, reading a current self-adaptive threshold variable and a threshold potential, and calculating a current self-adaptive threshold according to the current self-adaptive threshold variable and the threshold potential. Specifically, the self-adaptive threshold variable is determined according to whether the current pulse neuron output information (i.e., spike) calculated by a previous time step on the current pulse neuron is finally sent. If the pulse information of the previous time step is not sent, the self-adaptive threshold variable continues to decay on the basis of the previous time step, so that the difficulty of issuing the pulse sequence of a next time step is reduced, if the pulse information of the previous time step is sent, and then the self-adaptive threshold variable is added with a fixed increment after decay on the basis of the previous time step, and the difficulty of issuing the pulse sequence of the next time step is increased.

Step S500, when whether the current pulse neuron output information is greater than or equal to the self-adaptive threshold, if yes, proceeding to step S600, otherwise, jumping to step S700. Specifically, it is judged whether the current pulse neuron output information is greater than or equal to the self-adaptive threshold, so that a subsequent step determines whether to send the current pulse neuron output information according to the judgment result.

Step S600, outputting the current pulse neuron output information, and updating the current self-adaptive threshold variable according to a first self-adaptive threshold update model. Specifically, if the current pulse neuron output information is greater than or equal to the self-adaptive threshold, the current pulse neuron output information is sent, the current self-adaptive threshold variable is updated according to the first self-adaptive threshold update model, so that the current self-adaptive threshold variable is added with a fixed increment in the calculation of the next time step, and the difficulty of issuing the current pulse neuron output information calculated in a next time step is increased.

Step S700, not outputting the current pulse neuron output information, and updating the current self-adaptive threshold variable according to a second self-adaptive threshold update model. Specifically, if the current pulse neuron output information is smaller than the self-adaptive threshold, the current pulse neuron output information is not sent, and the current self-adaptive threshold variable is updated according to the second self-adaptive threshold update model, so that the current self-adaptive threshold variable continues to decay in the calculation of a next time step, and the difficulty of issuing the current pulse neuron output information calculated in the next time step is reduced.

The self-adaptive threshold neuron information processing method provided by the present disclosure calculates a current self-adaptive threshold by reading a current self-adaptive threshold variable and a threshold potential in the calculation of current pulse neuron output information; and according to the current self-adaptive threshold, determines whether to output current pulse neuron output information and determines to update a current self-adaptive variable model. The self-adaptive threshold pulse neuron information processing method provided by the disclosure can raise a threshold of the neuron that currently issues output information, and increase the difficulty of next issue; and decrease a threshold of the neuron that currently does not issue output information, reduce the difficulty of next issue, effectively balance the issue frequency of each neuron in the entire network, so that each neuron can play a role in processing information, this greatly improves the information processing capability of pulse neural network, reduces computational overhead, and decreases processing requirements.

FIG. 2 is a schematic flowchart of a self-adaptive threshold neural network information processing method of another embodiment, and the self-adaptive threshold neural network information processing method as shown in FIG. 2 includes:

Step S100b: receiving pulse tip information output by a front end pulse neuron, and a connection weight index of a front end pulse neuron and a current pulse neuron. Specifically, the connection weight index of the front end pulse neuron and the current pulse neuron is a weight index sent by the front end neuron together with the output information of the front end pulse neuron, and is used to indicate extraction of the current neuron weight.

The pulse tip information output by the front end pulse neuron is a pulse tip signal (spike) sent by the front end pulse neuron.

Step S200b, reading a current time window width, a pulse tip information sequence in a current time window, historical membrane potential information, and membrane potential leakage information. Specifically, the pulse tip information sequence in the current time window refers to an information sequence in which the pulse tip information received in a time step of a passed time range in the current time window width is sequentially cached in chronological order.

Step S300b, reading connection weight of the front end pulse neuron and the current pulse neuron according to the connection weight index of the front end pulse neuron and the current pulse neuron. Specifically, the connection weight index of the front end pulse neuron and the current pulse neuron is an address information, and the current neuron reads the connection weight of the front end pulse neuron and the current pulse neuron according to the received connection weight index of the front end pulse neuron and the current pulse neuron in the memory of the current pulse neuron. According to the connection weight information, the front end neuron output information can be used during participating in the calculation process of the current neuron output information to more accurately reflect the weight of the front end neuron output information and carry more abundant information.

Step S400b, updating the pulse tip information sequence in the current time window according to the pulse tip information output by the front end pulse neuron and the pulse tip information sequence in the current time window, and obtaining a pulse tip information updated sequence in the current time window. Specifically, the pulse tip information sequence, in an operation step of each pulse neuron, after storing a new pulse tip information in a head of the sequence, deletes the pulse tip information at the position of a tail of the sequence, and updates the pulse tip sequence once.

Step S500b: calculating front end pulse neuron input information by an attenuation function according to the current time window width and the pulse tip information updated sequence in the current time window. Specifically, the front end pulse neuron input information is calculated by using $\Sigma_{t-T_w \leq \delta_j \leq t} K(t-\delta_j)$, wherein, $T_w$ is the time window width, and $\delta_j$ is the time step in the pulse tip information updated sequence in the current time window after issuing spike in the current time window by the front end neuron j. $K(\Delta t)$ is an attenuation function that decreases rapidly as $\Delta t$ increases.

Step S600b, calculating current pulse neuron output information by a pulse neuron calculation model, according to the front end pulse neuron input information, the connection weight of the front end pulse neuron and the current pulse neuron, the historical membrane potential information, and the membrane potential leakage information. Specifically, the calculation of the front end pulse neuron input information is represented by the following formula:

$$V_i(t) = f\left(V_i(t-1) + \sum_{j=1}^{N} W_{ij} \sum K(t-\delta_1) + V_{leak}\right)$$

wherein $W_{ij}$ is the connection weight of the front end pulse neuron j and the current pulse neuron i, $T_w$ is the time window width, and $\delta_j$ is the time step in the pulse tip information updated sequence in the current time window after issuing spike in the current time window by the front end neuron j.

$K(\Delta t)$ is an attenuation function that decreases rapidly as $\Delta t$ increases. $V_{leak}$ is leakage value information. A basic model at the cell body can be simplified to:

$$V_{SNN} = f(V + V_{input} + V_{leak})$$

The issue model and the reset model are unchanged, wherein V is the historical membrane potential information stored in a memory, $V_{input}$ is the input of the current beat after accumulation, equivalent to the above $\Sigma_{j=1}^{N} W_{ij} \Sigma_{t-T_w \leq \delta_j \leq t} K(t-\delta_j) \Sigma_{j=1}^{N} W_{ij} \Sigma_{t-T_w \leq \delta_j \leq t} K(t-\delta_j)$, and $V_{leak}$ is the leakage value information.

In this embodiment, updating the pulse tip information sequence in the current time window according to the pulse tip information output by the front end pulse neuron and the pulse tip information sequence in the current time window to obtain the pulse tip information updated sequence in the current time window, calculating the front end pulse neuron input information by an attenuation function according to the current time window width, and the connection weight of the front end pulse neuron and the current pulse neuron, can support a space-time pulse neural network model with a time depth, in contrast to a neural network technical solution with the time depth only being one, and can greatly improve the space-time information coding ability of a pulse neural network and enrich the application space of a pulse neural network.

FIG. 3 is a schematic flow chart of a self-adaptive threshold neural network information processing method according to still another embodiment, and the self-adaptive threshold neural network information processing method as shown in FIG. 3 includes:

Step S100c, calculating current pulse neuron output information and a self-adaptive threshold.

Step S200c, judging whether the current pulse neuron output information is greater than or equal to the self-adaptive threshold, determining that issuance trigger flag information is issuance trigger, according to a comparison result, and the issuance trigger flag information includes issuance trigger or issuance no trigger, when determining that the issuance trigger flag information is issuance trigger, proceeding to step S300c. and determining that the issuance trigger flag information is issuance no trigger, jumping to step S400c. Specifically, the self-adaptive threshold potential is compared with the current pulse neuron output information, and the issuance trigger flag information is determined according to the comparison result. The current pulse neuron output information is sent only when the current pulse neuron output information is greater than the self-adaptive threshold potential.

Step S300c, resetting a refractory period timer, and updating the historical membrane potential information as preset reset membrane potential information.

Specifically, when the issuance trigger flag information is issuance trigger, the current pulse neuron output information is sent, and after the refractory period timer is reset, the refractory period is recalculated, and the historical membrane potential information is updated to the preset membrane potential information, and the historical membrane potential information is updated, the membrane potential is selectively reset to the current membrane potential, a difference value of a current membrane potential and a threshold potential, or a fixed reset voltage according to a configured reset type.

Step S400c, reading a refractory period width and a current time step of a refractory period timer. Specifically, when the issuance trigger flag information is issuance no trigger, the current pulse neuron output information is not sent, and further determining whether the current is in the refractory period. The refractory period width is a duration range of the refractory period, and the refractory period timer is timed by means of a time step.

Step S500c, judging whether current time is in the refractory period according to the refractory period width and the current time step of the refractory period timer. If current time is in the refractory period, proceeding to step S600c, otherwise jumping to step S700c. Specifically, according to the cumulative calculation of the current time steps of the refractory period timer, it can be judged whether the current time step is still in the refractory period.

Step S600c, cumulatively timing the refractory period timer for one time step, and not updating the historical membrane potential information. Specifically, if the current time is in the refractory period, according to the biomimetic characteristics of the pulsed neural network, no any response is made to the pulse nerve output information, and the historical membrane potential information is not updated, and the historical membrane potential information is needed to be read by the pulse neurons in the next time step, that is, during the refractory period, the pulse neuron output information calculated this time does not participate in calculation of a next time step.

Step S700c, cumulatively timing the refractory period timer one time step, and updating the historical membrane potential information as the current pulse neuron output information. Specifically, if the current time is not in the refractory period, the historical membrane potential information is used as the current pulse neuron output information, and to participate in the calculation of a next time step.

In this embodiment, by means of a self-adaptively threshold potential, the neuron issue pulse tip information is related to whether the current pulse neuron output information is issued in a previous time step, and the issue frequency of each neuron in the entire network can be effectively balanced, so that each neuron can play a role in processing information, greatly improving the information processing capabilities of a pulse neural network.

In an embodiment, the outputting the current pulse neuron output information includes reading an issuance enablement identifier, the issuance enablement identifier includes allowance for issuing data or no allowance for issuing data, when the issuance enablement identifier is the allowance for issuing data, the issuance trigger flag information is read when the issuance trigger flag information is issuance trigger, the current pulse neuron output information is output.

In this embodiment, by setting the issuance enablement identifier and issuance trigger flag, the current pulse neuron output information is determined, so that the output of the pulse neuron is higher controllable, and the issuance enablement identifier can be configured with that some neurons are not allowed to issue data, but only used as an intermediate auxiliary calculation neuron, this is very necessary for some functions that require multiple neurons to achieve by cooperation.

Figure 4:
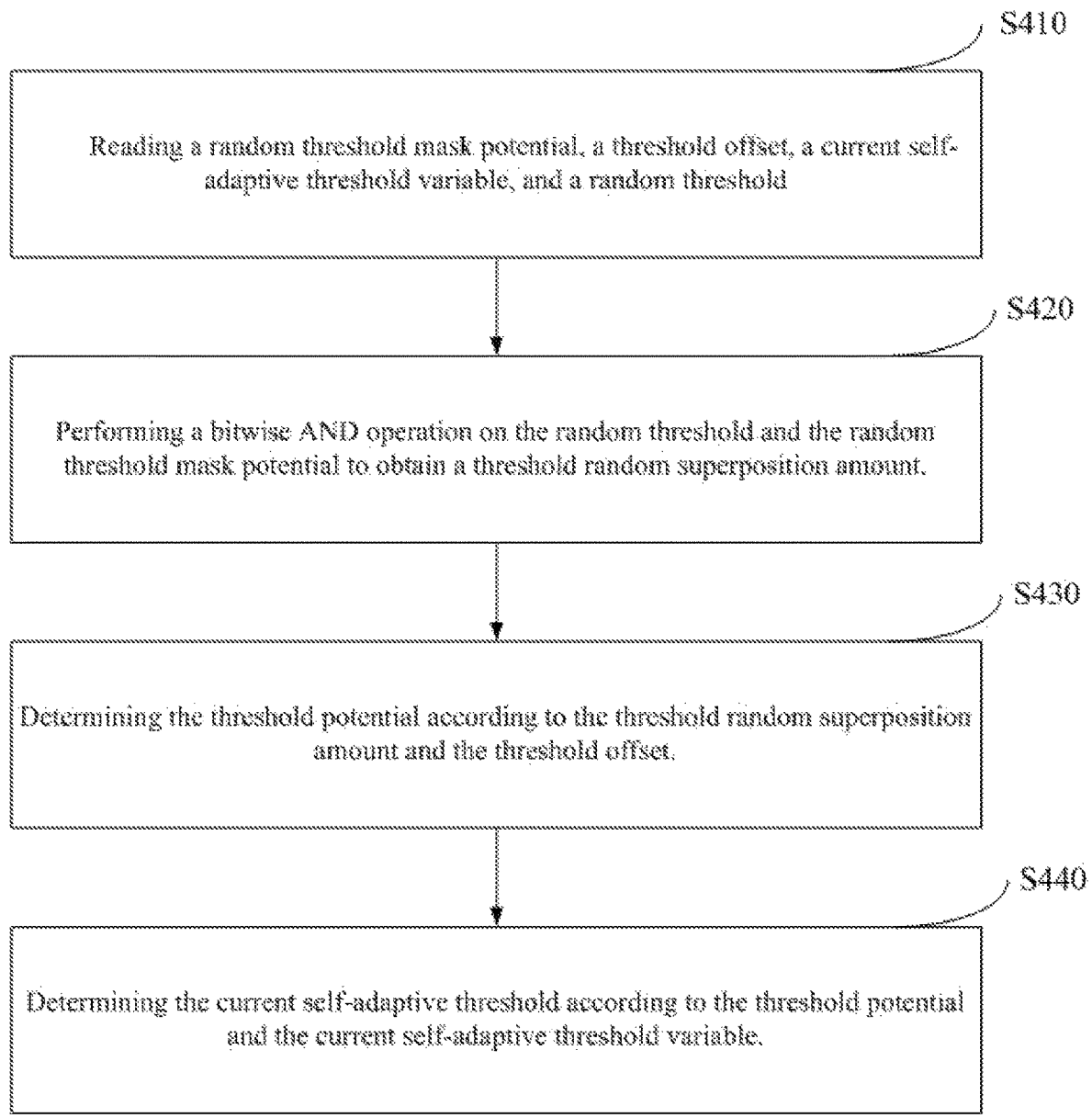
FIG. 4 is a schematic flow chart of a self-adaptive threshold neural network information processing method according to yet another embodiment.

FIG. 4 is a schematic flow chart of a self-adaptive threshold neural network information processing method according to yet another embodiment, and the self-adaptive threshold neuron network information processing method as shown in FIG. 4 includes:

Step S410, reading a random threshold mask potential, a threshold offset, a current self-adaptive threshold variable, and a random threshold.

Specifically, the current self-adaptive threshold variable is a self-adaptive threshold variable value obtained by gradually attenuated or increased at the beginning of a task according to a preset self-adaptive threshold initial value, a preset attenuation coefficient, and an issuance threshold increment as each time step gradually attenuates or arises. The current self-adaptive threshold variable is a self-adaptive threshold variable of a current time step read by the current pulse neuron. The random threshold is given a random number seed through a configuration register which is generated by a pseudo random number generator.

Step S420, performing a bitwise AND operation on the random threshold and the random threshold mask potential to obtain a threshold random superposition amount. Specifically, the random threshold mask potential is used to limit the range of threshold increments.

Step S430, determining the threshold potential according to the threshold random superposition amount and the threshold offset. Specifically, the threshold random superposition amount is added with the threshold offset d to obtain the threshold potential.

Step S440, determining the current self-adaptive threshold according to the threshold potential and the current self-adaptive threshold variable. Specifically, the threshold potential and the current self-adaptive threshold variable are added to determine the current self-adaptive threshold. Wherein, the threshold random superposition amount is added with a preset threshold offset $V_{th0}$ to generate a true threshold potential $V_{th}$. Wherein, seeds of a pseudo random number generator are given by a configuration register $V_{seed}$. A mask potential $V_{mask}$ is used to limit the range of threshold increments: if $V_{mask}=0$, a threshold random superposition amount is also 0, an issue mode degenerates to a fixed threshold issue, and a fixed threshold is $V_{th0}$; if $V_{mask}\neq 0$, the issue mode is a partial probability threshold issue. When an extreme case is $V_{th0}=0$, the issue mode is a full probability threshold issue.

In this embodiment, the threshold potential is determined by reading a random threshold mask potential and a threshold offset and receiving a configuration value given by a configuration register, so that a neuron issues pulse tip information with a certain probability of randomness, regardless of whether a membrane potential exceeds a fixed threshold offset, and because there is a positive or negative threshold random superposition amount, a neuron cell body may issue pulses, which improves the calculation ability and information processing capability of a pulse neural network model.

FIG. 5 is a schematic flow chart of a self-adaptive threshold neural network information processing method according to still another embodiment. The self-adaptive threshold neural network information processing method as shown in FIG. 5 are detailed steps of a section for updating the current self-adaptive threshold variable according to a first self-adaptive threshold update model in FIG. 1, and include:

Step S610, reading an issuance threshold increment and the current self-adaptive threshold variable. Specifically, the issuance threshold increment is a preset value, and may be set according to a requirement of a task.

Step S620, calculating a first threshold according to a preset attenuation constant and the current self-adaptive threshold variable. Specifically, the read current self-adaptive threshold variable is calculated according to a preset attenuation coefficient to obtain the first threshold. The first threshold is a self-adaptive threshold variable after performing the attenuation in this time step.

Step S630, superposing the issuance threshold increment to the first threshold, and obtaining a second threshold. Specifically, after performing the attenuation in this time step, the preset issuance threshold increment is superposed to the first threshold, and the second threshold is obtained.

Step S640, updating the current self-adaptive threshold variable according to the second threshold. Specifically, the current self-adaptive threshold variable is updated to the second threshold. Because the second threshold is a self-adaptive variable superposed with a preset issuance threshold increment after performing the attenuation calculation, so that the self-adaptive threshold read out in the next time step is increased, and an issue difficulty of current pulse neuron output information in a next time step is increased.

For the first self-adaptive threshold update model provided in this embodiment, in the case that the current pulse neuron output information is sent, the current self-adaptive threshold is superposed with a preset increment after performing attenuation, so that the issue difficulty of the current pulse neuron output information in a next time step is increased. By adding flexible features to the threshold in this way, the issue rate of the entire network can be made uniform, and each neuron has an opportunity to learn its own input experience field.

FIG. 6 is a schematic flow chart of a self-adaptive threshold neural network information processing method according to still another embodiment. The self-adaptive threshold neural network information processing method as shown in FIG. 6 are detailed steps of a section of updating the current self-adaptive threshold variable according to a second self-adaptive threshold update model in FIG. 1, and include:

Step S710, reading the current self-adaptive threshold variable. Specifically, since the current pulse neuron output information is not sent, there is no need to increase the self-adaptive threshold.

Step S720, calculating a third threshold according to the preset attenuation constant and the current self-adaptive threshold variable. Specifically, the read current self-adaptive threshold variable is calculated according to a preset attenuation coefficient to obtain a third threshold, where the third threshold is a self-adaptive threshold variable after performing attenuation in the time step.

Step S730, updating the current self-adaptive threshold variable according to the third threshold. Specifically, an attenuated self-adaptive variable, (that is the third threshold), is set to a current self-adaptive threshold increment, this reduces the issue difficulty of current pulse neuron output information of a next time step.

The second self-adaptive threshold update model provided in this embodiment performs attenuate of the current self-adaptive threshold in the case that the current pulse neuron output information is not sent, so that the issue difficulty of the current pulse neuron output information in a next time step is reduced. By adding flexible features to the threshold in this way, the issue rate of the entire network can be made uniform, and each neuron has an opportunity to learn its own input experience field.

FIG. 7 is a schematic structural diagram of a self-adaptive threshold neural network information processing system according to an embodiment. The self-adaptive threshold neural network information processing system as shown in FIG. 7 includes:

a front end pulse neuron output information receiving module 100, used for receiving front end pulse neuron output information; the front end pulse neuron output information includes: pulse tip information output by a front end pulse neuron, a connection weight index of the front end pulse neuron and current pulse neuron;

a current pulse neuron information reading module 200, used for reading current pulse neuron information; the current pulse neuron information includes: a current time window width, a pulse tip information sequence in the current time window, historical membrane potential information, and membrane potential leak information;

a current pulse neuron output information calculating module 300, used for calculating current pulse neuron output information according to the front end pulse neuron output information and the current pulse neuron information;

a current self-adaptive threshold calculating module 400, used for reading a current self-adaptive threshold variable and a threshold potential, and calculating a current self-adaptive threshold according to the current self-adaptive threshold variable and the threshold potential;

a current pulse neuron output information outputting module 500, used for outputting the current pulse neuron output information when the current pulse neuron output information is greater than or equal to the self-adaptive threshold, and updating the current self-adaptive threshold variable according to a first self-adaptive threshold update model, otherwise not outputting the current pulse neuron output information, and updating the current self-adaptive threshold variable according to a second self-adaptive threshold update model.

The self-adaptive threshold neuron information processing system provided by the present disclosure calculates a current self-adaptive threshold by reading a current self-adaptive threshold variable and a threshold potential in the calculation of the current pulse light nerve output information; and according to the current self-adaptive threshold, determines whether to output current pulse neuron output information and determines to update the model of the current self-adaptive variable. The self-adaptive threshold neuron information processing system provided by the disclosure can raise a neuron threshold issued currently, and increase the difficulty of next issue; while decrease a neuron threshold not issued currently, and reduce the difficulty of next issue. In this way, the issue frequency of each neuron in the entire network can be effectively balanced, so that each neuron can play a role in processing information, and greatly improve the information processing capability of the pulse neural network.

FIG. 8 is a schematic structural diagram of a self-adaptive threshold neural network information processing system according to another embodiment. The self-adaptive threshold neural network information processing system as shown in FIG. 8 is the current pulse neuron output information calculating module 300 in FIG. 7, and includes:

a pulse neuron connection weight reading unit 100b, used for reading the connection weight of the front end pulse neuron and the current pulse neuron according to the connection weight index of the front end pulse neuron and the current pulse neuron;

a time window inner pulse tip information sequence updating unit 200b, used for updating the pulse tip information sequence in the current time window according to the pulse tip information output by the front end pulse neuron and the pulse tip information sequence in the current time-window, to obtain a pulse tip information updated sequence in the current time window;

a front end pulse neuron input information calculating unit 300b, used for calculating front end pulse neuron input information by using an attenuation function according to the current time window width, and the connection weight of the front end pulse neuron and the current pulse neuron;

a pulse neuron output information calculating unit 400b, used for calculating current pulse neuron output information by a pulse neuron calculation model according to the front end pulse neuron input information, the pulse tip information updated sequence in the current time window, the historical membrane potential information, and the membrane potential leakage information.

In this embodiment, updating the pulse tip information sequence in the current time window according to the pulse tip information output by the front end pulse neuron and the pulse tip information sequence in the current time window to obtain the pulse tip information updated sequence in the current time window, calculating the front end pulse neuron input information by an attenuation function according to the current time window width, and the connection weight of the front end pulse neuron and the current pulse neuron, can support a space-time pulse neural network model with a time depth, in contrast to a neural network technical solution with the time depth only being one, and can greatly improve the space-time information coding ability of a pulse neural network and enrich the application space of a pulse neural network.

FIG. 9 is a schematic structural diagram of a self-adaptive threshold neural network information processing system according to still another embodiment. The self-adaptive threshold neural network information processing system as shown in FIG. 9, is the current pulse neuron output information outputting module in FIG. 7, includes:

an issuance trigger determining unit 100c, used for determining that the issuance trigger flag information is issuance trigger, and the issuance trigger flag information includes issuance trigger or issuance no trigger;

an issuance trigger action unit 200c, used for the refractory period timer, and updating the historical membrane potential information to preset reset membrane potential information.

when an issuance trigger determining unit 100c determines that the issuance trigger flag information is issuance no trigger;

an issuance no trigger action unit 300c, used for reading a refractory period width and a current time step of the refractory period timer; judging whether the current time is in the refractory period according to the refractory period width and the current time step of the refractory period timer, if the current time is in the refractory period, cumulatively timing the refractory period timer one time step, and not updating the historical membrane potential information; if the current time is not in the refractory period, cumulatively timing the refractory period timer one time step, and updating the historical membrane potential information to the current pulse neuron output information.

a first self-adaptive threshold updating unit 400c, used for reading an issuance threshold increment and the current self-adaptive threshold variable; calculating a first threshold according to a preset attenuation constant and the current self-adaptive threshold variable; superposing the issuance threshold increment to the first threshold to obtain a second threshold; and updating the current self-adaptive threshold variable according to the second threshold.

a second self-adaptive threshold updating unit 500c, used for reading the current self-adaptive threshold variable; calculating a third threshold according to the preset attenuation constant and the current self-adaptive threshold variable, and updating the current self-adaptive threshold variable according to the third threshold.

an issuance enablement identifier reading unit 600c, used for reading an issuance enablement identifier, the issuance enablement identifier includes allowance of issuing data or no allowance of issuing data, when the issuance enablement identifier is allowance of issuing data, an issuance trigger flag information reading unit 700c, used for reading the issuance trigger flag information when the issuance trigger flag information is issuance trigger.

a current pulse neuron output information outputting unit 800c, used for outputting the current pulse neuron output information.

The self-adaptive threshold update model provided in this embodiment, in the case that the current pulse neuron output information is sent, performs the attenuation of the current self-adaptive threshold, and superposes a preset increment, so that the issue difficulty of the current pulse neuron output information in a next time step increases. In the case that the current pulse neuron output information is not sent, the current self-adaptive threshold is performed to be attenuated, so that the issue difficulty of the current pulse neuron output information in a next time step decreases. By adding flexible features to the threshold in this way, the issue rate of the entire network can be made uniform, and each neuron has an opportunity to learn its own input experience field.

FIG. 10 is a schematic structural diagram of a self-adaptive threshold neural network information processing system according to still another embodiment. The self-adaptive threshold neural network information processing system as shown in FIG. 10, is the current self-adaptive threshold calculating module 400 in FIG. 7, includes:

a threshold information receiving unit 410, used for reading a random threshold mask potential, a threshold offset, and a random threshold;

a threshold random superposition amount obtaining unit 420, used for performing a bitwise and operation on the random threshold and the random threshold mask potential to obtain a threshold random superposition amount;

a threshold potential determining unit 430, used for determining the threshold potential according to the threshold random superposition amount and the threshold offset;

a current self-adaptive threshold determining unit 440, used for determining the current self-adaptive threshold according to the threshold potential and the current self-adaptive threshold variable.

FIG. 11 is a schematic flow chart of a self-adaptive leakage value neural network information processing method according to an embodiment, and the self-adaptive leakage value neural network information processing method as shown in FIG. 1 includes:

Step S100', receiving front end pulse neuron output information.

Specifically, the front end pulse neuron output information is the pulse information output by a pulse neuron at a front end and connected to a current pulse neuron.

Step S200', reading current pulse neuron information, the current pulse neuron information includes self-adaptive membrane potential leakage information.

Specifically, the current pulse neuron information includes a historical pulse information sequence sent by a front end pulse neuron stored by a current neuron, and self-adaptive membrane potential leakage information.

Step S300', calculating current pulse neuron output information according to the front end pulse neuron output information and the current pulse neuron information.

Specifically, the current pulse neuron calculates the current pulse neuron output information according to the received pulse information output by the front end pulse neuron and the read current pulse neuron information.

Step S400', updating the self-adaptive membrane potential leakage information according to the current pulse neuron output information.

Specifically, the self-adaptive membrane potential leakage information is updated according to the current pulse neuron output information, and is used for calculation of current pulse neuron output information in a next time step.

Step S500', outputting the current pulse neuron output information.

The self-adaptive leakage value neuron information processing method provided by the present disclosure utilizes self-adaptive membrane potential leakage information to participate in calculation of current pulse neuron output information, and utilizes the calculated current pulse neuron output information to update the self-adaptive membrane potential information to participate in the calculation of a next time step. Unlike traditional fixed leakage values, a good balance between sensitivity and stability of the neural network is achieved.

Figure 12:
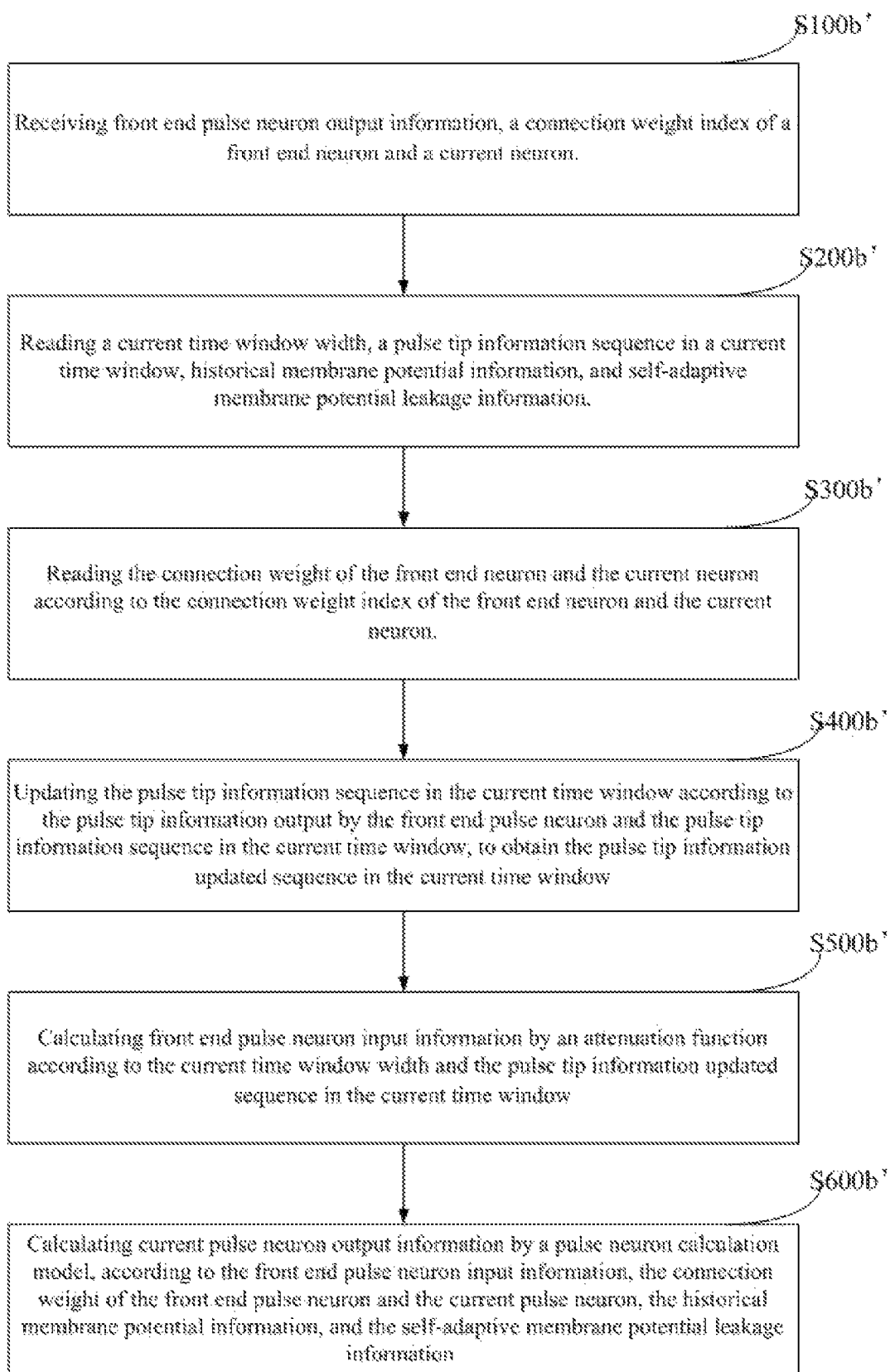
FIG. 12 is a schematic flow chart of a self-adaptive leakage value neural network information processing method according to another embodiment.

FIG. 12 is a schematic flowchart diagram of a self-adaptive leakage value neural network information processing method according to another embodiment, and the self-adaptive leakage value neural network information processing method as shown in FIG. 12 includes:

Step S100b', receiving front end pulse neuron output information, comprising: pulse tip information output by a front end pulse neuron, and a connection weight index of a front end neuron and a current neuron.

Specifically, the connection weight index of the front end pulse neuron and the current pulse neuron is a weight index sent by the front end neuron together with the output information of the front end pulse neuron, and is used to indicate the extraction of the current neuron weight. The pulse tip information output by the front end pulse neuron is a pulse tip signal (spike) sent by the front end pulse neuron.

Step S200b', reading current pulse neuron information, further comprising: a current time window width, a pulse tip information sequence in a current time window, historical membrane potential information, and self-adaptive membrane potential leakage information.

Specifically, the pulse tip information sequence in the current time window refers to an information sequence in which the pulse tip information received in a time step in a passed certain range is sequentially buffered in chronological order in the current time window width.

Step S300b', reading a connection weight of the front end neuron and the current neuron according to the connection weight index of the front end neuron and the current neuron.

Specifically, the connection weight index of the front end pulse neuron and the current pulse neuron is an address information, and the current neuron reads the connection weight of the front end pulse neuron and the current pulse neuron according to the received connection weight index of the front end pulse neuron and the current pulse neuron in the memory of the current pulse neuron. According to the connection weight information, the front end neuron output information can be used during participating in the calculation process of the current neuron output information to more accurately reflect the weight of the front end neuron output information and carry more abundant information.

Step S400b', updating pulse tip information sequence in the current time window according to the pulse tip information output by the front end pulse neuron and the pulse tip information sequence in the current time window, to obtain the pulse tip information updated sequence in the current time window.

Specifically, the pulse tip information sequence, after storing a new pulse tip information in a head of the sequence in the operation step of each pulse neuron, deletes the pulse tip information at a tail position of the sequence, and updates the pulse tip sequence once.

Step S500b', calculating the front end pulse neuron input information by an attenuation function according to a current time window width and the pulse tip information updated sequence in the current time window.

Specifically, the front end pulse neuron input information is calculated by using $\Sigma_{t-T_w \leq \delta_j \leq t} K(t-\delta_j)$, wherein, $T_w$ is the time window width, and $\delta_j$ is the time step in the pulse tip information updated sequence in the current time window after issuing spike in the current time window by the front end neuron. $K(\Delta t)$ is an attenuation function that decreases rapidly as $\Delta t$ increases, t is current time, and the $\Delta t$ is a time change value.

Step S600b', calculating current pulse neuron output information by a pulse neuron calculation model, according to the front end pulse neuron input information, the connection weight of the front end pulse neuron and the current pulse neuron, the historical membrane potential information, and the self-adaptive membrane potential leakage information.

Specifically, the calculation of the front end pulse neuron input information is represented by the following formula:

$$V_i(t) = f(V_i(t-1) + \Sigma_{j=1}^N W_{ij} \Sigma_{t-T_w \leq \delta_j \leq t} K(t-\delta_j) + V_{leak})$$

wherein, $W_{ij}$ is the connection weight of the front end pulse neuron j and the current pulse neuron i, $T_w$ is the time window width, and $\delta_j$ is the time step in the pulse tip information updated sequence in the current time window after issuing spike in the current time window by the front end neuron j. $K(\Delta t)$ is an attenuation function that decreases rapidly as $\Delta t$ increases. The basic model at the cell body can be simplified to:

$$V_{SNN} = f(V + V_{input} + V_{leak})$$

the issue model and the reset model are unchanged, where V is the historical membrane potential information stored in the memory, and $V_{input}$ is the input of the current beat after accumulation, equivalent to the above $\Sigma_{j=1}^N W_{ij} \Sigma_{t-T_w \leq \delta_j \leq t} K(t-\delta_j)$, and $V_{leak}$ is a self-adaptive leakage value information. The $V_{leak}$ is calculated based on a current membrane potential, resting membrane potential information, and a leakage value scaling factor.

In this embodiment, updating the pulse tip information sequence in the current time window according to the pulse tip information output by the front end pulse neuron and the pulse tip information sequence in the current time window to obtain the pulse tip information updated sequence in the current time window, calculating the front end pulse neuron input information by an attenuation function according to the current time window width, and the connection weight of the front end pulse neuron and the current pulse neuron, can support a space-time pulse neural network model with a time depth, in contrast to a neural network technical solution with the time depth only being one, and can greatly improve the space-time information coding ability of a pulse neural network and enrich the application space of a pulse neural network.

FIG. 13 is a schematic flowchart of a self-adaptive leakage value neural network information processing method according to still another embodiment, and the self-adaptive leakage value neural network information processing method as shown in FIG. 13 includes:

Step S100c', calculating current pulse neuron output information and a threshold potential.

Step S200c, judging whether the current pulse neuron output information is greater than or equal to the threshold potential, and determining issuance trigger flag information according to the comparison result, the issuance trigger flag information includes issuance trigger or issuance no trigger, and when determining the flag information is the issuance trigger, proceeding to step S300c', and when determining the issuance trigger flag information is issuance no trigger, jumping to step S400c'.

Specifically, the threshold potential is compared with the current pulse neuron output information, and the issuance trigger flag information is determined according to the comparison result. The current pulse neuron output information is sent only when the current pulse neuron output information is greater than the threshold potential.

Step S300c', resetting a refractory period timer, and updating the historical membrane potential information as preset reset membrane potential information.

Specifically, when the issuance trigger flag information is issuance trigger, the current pulse neuron output information is sent, and after the refractory period timer is reset, the refractory period is recalculated, and the historical membrane potential information is updated to the preset membrane potential information, and the historical membrane potential information is updated, the membrane potential is selectively reset to the current membrane potential, a difference value of the current membrane potential and the threshold potential, or a fixed reset voltage according to a configured reset type.

Step S400c', reading a refractory period width and a current time step of a refractory period timer.

Specifically, when the issuance trigger flag information is issuance no trigger, the current pulse neuron output information is not sent, and further determining whether the current is in the refractory period. The refractory period width is a duration range of the refractory period, and the refractory period timer is timed by means of a time step.

Step S500c', according to the refractory period width and the current time step of the refractory period timer, judging whether current time is in the refractory period, and if current time is in the refractory period, proceeding to step S600c', otherwise, jumping to step S700c'.

Specifically, according to the cumulative calculation of the current time step of the refractory period timer, it can be determined whether the current time step is still in the refractory period.

Step S600c', cumulatively timing the refractory period timer one time step, and not updating the historical membrane potential information.

Specifically, if the current time is in the refractory period, according to the biomimetic characteristics of the pulse neural network, no response is made to the pulse neuron output information, and the historical membrane potential information is not updated, and the historical membrane potential information is the information which needs to be read by a the pulse neuron in a next time step, that is, during the refractory period, the pulse neuron output information calculated this time does not participate in the calculation of the next time step.

Step S700c', cumulatively timing the refractory period timer one time step, and updating the historical membrane potential information as the current pulse neuron output information. Specifically, if not in the refractory period, the historical membrane potential information is the current pulse neuron output information and used to participate in the calculation of the next time step.

In this embodiment, the pulse tip information sequence in the current time window is updated according to the pulse tip information output by the front end pulse neuron and the pulse tip information sequence in the current time window, and the pulse tip information updated sequence in the current time window is obtained. Calculating the front end pulse neuron input information by an attenuation function according to the current time window width, and the connection weight of the front end pulse neuron and the current pulse neuron, can support the space-time pulse neural network model with a time depth, in contrast to a neural network technical solution with the time depth only being one, and can greatly improve the space-time information coding ability of the pulse neural network and enrich the application space of the pulse neural network.

In an embodiment, the obtaining a threshold potential includes: reading a random threshold mask potential, a threshold offset, and a random threshold; performing a bitwise AND operation on the random threshold and the random threshold mask potential to obtain a threshold random superposition amount; determining the threshold potential according to the threshold random superposition amount and the threshold offset. Specifically, a pseudo random number generator generates a random threshold $V_{rand}$, the random threshold and a preset random threshold mask potential $V_{mask}$ are used to perform a bitwise AND operation to generate a threshold random superposition amount, and then the threshold random superposition amount is added with a preset threshold offset $V_{th0}$ is to produce a true threshold potential $V_{th}$. Wherein, an initial seed of the pseudo random number generator is given by a configuration register $V_{seed}$. The mask potential $V_{mask}$ is used to limit a range of threshold increment: if $V_{mask}=0$, the threshold random superposition amount is also 0, the issue mode degenerates to a fixed threshold issue, and the fixed threshold is $V_{th0}$; if $V_{mask}\neq 0$, the issue mode is partial probability threshold issue. When an extreme case is $V_{th0}=0$, the issue mode is full probability threshold issue.

In the present embodiment, the threshold potential is determined by reading a random threshold mask potential and a threshold offset and receiving a configuration value given by a configuration register, so that a neuron issues pulse tip information with a certain probability of randomness.

In an embodiment, the outputting the current pulse neuron output information comprises: reading an issuance enablement identifier, wherein the issuance enablement identifier includes allowance of issuing data or no allowance of issuing data; when the issuance enablement identifier is allowance of issuing data, the issuance trigger flag information is read, and when the issuance trigger flag information is issuance trigger, the current pulse neuron output information is output.

In this embodiment, by setting an issuance enablement identifier and an issuance trigger flag to determine the current pulse neuron output information, so that the output of the pulse neuron is more controllable, and the issuance enablement identifier can be configured with that some neurons are not allowed to issue date and only used as an intermediate auxiliary computing neuron, this is very necessary for some functions that require multiple neurons to achieve by cooperation.

FIG. 14 is a schematic flowchart diagram of a self-adaptive leakage value neural network information processing method according to still another embodiment, and the self-adaptive leakage value neural network information processing method as shown in FIG. 14 includes:

Step S410', reading resting membrane potential information and a leakage value scaling factor. Specifically, the resting membrane potential information and the leakage value scaling factor are values set according to requirements at the beginning of a task.

Step S420', updating the self-adaptive membrane potential leakage information according to the resting membrane potential information, the leakage value scaling factor, and the current pulse neuron output information. Specifically, the self-adaptive membrane potential leakage information $V_{leak}$ is related to the current pulse neuron output information of the current pulse neuron, and has a self-adaptive capability. The update of self-adaptive leakage information will be carried out in each time step: $V_{leak}=C_{leak}\cdot(V_{rest}-V_{SNN})$, wherein $C_{leak}$ is a leakage value scaling factor, $V_{rest}$ is resting membrane potential information, and $V_{SNN}$ is current pulse neuron output information. In simple terms, $(V_{rest}-V_{SNN})$ is no longer a fixed constant leakage value of $V_{leak}$, meaning that the smaller the $V_{SNN}$ (closer to the resting potential $V_{rest}$), the smaller the leakage value, and the larger the $V_{SNN}$ (the farther away from the resting potential $V_{rest}$), the larger the leakage value. This manner of a flexible leakage value can effectively maintain the balance of the cell body membrane potential, so that the membrane potential does not lose response to external stimuli because the leakage is too big, and it is not too sensitive to external stimuli because the leakage is too small, the sensitivity and stability of the membrane potential are very critical and are equally crucial for a complex model of learning.

In this embodiment, a neuron self-adaptive leakage value is made more flexible and controllable by setting a leakage value scaling factor.

FIG. 15 is a schematic structural diagram of a self-adaptive leakage value neural network information processing system according to an embodiment. The self-adaptive leakage value neural network information processing system as shown in FIG. 15 includes:

a front end pulse neuron output information receiving module 100', used for receiving front end pulse neuron output information. The front end pulse neuron output information includes: pulse tip information output by a front end pulse neuron, and a connection weight index of a front end neuron and a current neuron.

a current pulse neuron information reading module 200', used for reading current pulse neuron information, and the current pulse neuron information includes self-adaptive membrane potential leakage information. The current pulse neuron information further includes: a current time window width, a pulse tip information sequence in the current time window, and historical membrane potential information.

a current pulse neuron output information calculating module 300', used for calculating current pulse neuron output information according to the front end pulse neuron output information and the current pulse neuron information.

a self-adaptive membrane potential leakage information updating module 400', used for updating the self-adaptive membrane potential leakage information according to the current pulse neuron output information, comprising: a leakage information reading unit, used for reading resting membrane potential information and a leakage value scaling factor; a leakage information updating unit, used for updating the self-adaptive membrane potential leakage information according to the resting membrane potential information, the leakage value scaling factor, and the current pulse neuron output information.

a current pulse neuron information outputting module 500', used for outputting the current pulse neuron output information, includes: an enablement identifier reading unit, used for reading an issuance enablement identifier, wherein the issuance enablement identifier includes allowance of issuing date or no allowance of issuing date; and when the issuance enablement identifier is allowance of issuing date, a trigger flag information reading unit is issued for reading the issuance trigger flag information when the issuance trigger flag information is issuance trigger; a current pulse neuron information outputting unit, used for outputting the current pulse neuron output information.

The self-adaptive leakage value neuron information processing system provided by the present disclosure utilizes self-adaptive membrane potential leakage information to participate in calculation of current pulse neuron output information, and utilizes the calculated current pulse neuron output information to update the self-adaptive membrane potential information to participate in calculation of a next time step. Unlike traditional fixed leakage values, a good balance between sensitivity and stability of a neural network is achieved. In this embodiment, by setting a leakage value scaling factor, the neuron self-adaptive leakage value is more controllable, and the balance between sensitivity and stability of a neural network is further improved.

FIG. 6 is a schematic structural diagram of a self-adaptive leakage value neural network information processing system according to another embodiment. For the self-adaptive leakage value neural network information processing system as shown in FIG. 6, the current pulse neuron output information calculating module 300', include:

a pulse neuron connection weight reading unit 100b', used for reading the connection weight of a front end neuron and a current neuron according to the connection weight index of the front end neuron and the current neuron.

a time window inner pulse tip information sequence updating unit 200b' for updating the pulse tip information sequence in the current time window according to the pulse tip information output by the front end pulse neuron and a pulse tip information sequence in the current time window, obtain the pulse tip information updated sequence in the current time window.

a front end pulse neuron input information calculating unit 300b', used for calculating front end pulse neuron input information by an attenuation function according to the current time window width and the pulse tip information updated sequence in the current time window.

a pulse neuron output information calculating unit 400b', used for calculating current pulse neuron output information by a pulse neuron calculation model according to the front end pulse neuron input information, the connection weight of the front end pulse neuron and the current pulse neuron, the historical membrane potential information, and the self-adaptive membrane potential leak information.

In this embodiment, updating the pulse tip information sequence in the current time window according to the pulse tip information output by the front end pulse neuron and the pulse tip information sequence in the current time window to obtain the pulse tip information updated sequence in the current time window, calculating the front end pulse neuron input information by an attenuation function according to the current time window width, and the connection weight of the front end pulse neuron and the current pulse neuron, can support a space-time pulse neural network model with a time depth, in contrast to a neural network technical solution with the time depth only being one, and can greatly improve the space-time information coding ability of a pulse neural network and enrich the application space of a pulse neural network.

FIG. 7 is a schematic structural diagram of a self-adaptive leakage value neural network information processing system according to still another embodiment, and the self-adaptive leakage value neural network information processing system as shown in FIG. 7 further includes:

a threshold potential obtaining module 600', used for obtaining a threshold potential, including: a threshold information reading unit, used for reading a random threshold mask potential, a threshold offset, and a random threshold; and a random superposition amount obtaining unit, used for performing a bitwise AND operation on the random threshold and the random threshold mask potential to obtain a threshold random superposition amount; and a threshold potential determining unit used for determining the threshold potential according to the threshold random superposition amount and the threshold offset.

an issuance trigger flag information determining module 700', used for comparing the current pulse neuron output information with the threshold potential, and determining the issuance trigger flag information according to a comparison result, wherein the issuance trigger flag information includes: issuance trigger or issuance no trigger; when the issuance trigger flag information is issuance trigger, a refractory period timer resetting module 800', used for resetting a refractory period timer and updating the historical membrane potential information to a preset reset membrane potential information.

When the issuance trigger flag information is issuance no trigger, a refractory period timer reading module 900', used for reading a refractory period width and a current time step of a refractory period timer;

a refractory period judging module 1000', used for judging whether the current time is in a refractory period according to the refractory period width and the current time step of the refractory period timer, if the current time is in the refractory period, cumulatively timing the refractory period timer for one time step, not updating the historical membrane potential information; if the current time is not in the refractory period, cumulatively timing the refractory period timer for one time step, and updating the historical membrane potential information to the current pulse neuron output information. In this embodiment, by means of a self-adaptively threshold potential, the neuron issue pulse tip information is related to whether the current pulse neuron output information is issued in a previous time step, and the issue frequency of each neuron in the entire network can be effectively balanced, so that each neuron can play a role in processing information, greatly improving the information processing capabilities of a pulse neural network.

Those skilled in the art should understand that embodiments of the present application can be provided as a method, system, or computer program product. Thus, the present application can take the form of a full hardware embodiment, a full software embodiment, or an embodiment in combination of software and hardware aspects. Moreover, the application can take the form of a computer program product embodied on one or more computer-usable storage media (including but not limited to a disk storage, CD-ROM, an optical storage, etc.) containing computer-usable program code therein.

The present application is described with reference to flow charts and/or block diagrams of methods, apparatuses (systems), and computer program products according to embodiments of the present application. It should be understood that each flow and/or block in flow charts and/or block diagrams, and the combinations of flows and/or blocks in flow charts and/or block diagrams can be achieved by computer program instructions. These computer program instructions can be provided to a processor of a general purpose computer, special purpose computer, embedded processor, or other programmable data processing device to produce a machine, for instructions executed by a processor of a computer or other programmable data processing device to generate a device for achieving functions specified in one or more flows of flow charts and/or in one or more blocks of block diagrams.

These computer program instructions can also be stored in a readable memory that can direct a computer or other programmable data processing device to work in a particular manner, such that the instructions stored in the computer readable memory generates manufacturing products containing an instruction device which achieves the functions specified in one or more flows of flow charts and/or one or more blocks of block diagrams.

These computer program instructions can also be loaded onto a computer or other programmable data processing device, such that a series of operation steps are performed on a computer or other programmable device to generate treatment achieved by computer, thus the instructions executed on a computer or other programmable device provide steps for achieving functions specified in one or more flows of flow charts and/or in one or more blocks of block diagrams.

The technical features of the above-described embodiments can be willfully combined. For the sake of brevity of description, all possible combinations of the technical features in the above embodiments are not described herein. However, as long as there is no contradiction between the combinations of these technical features, all should be considered as the scope recorded in this description.

The above-mentioned embodiments are merely illustrative of several embodiments of the present disclosure, and the description thereof is relatively specific and detailed, but is not to be understood to limit the scope of the invention. It should be pointed that several variations and improvements may be also made by those skilled in the art without departing from the conception of the disclosure, which are under a protection scope of this disclosure. Therefore, the protection scope of this disclosure should be determined by the appended claims.

What is claimed is:

1. A self-adaptive threshold neuron information processing method, executed by a processor, comprising:
receiving front end pulse neuron output information;
reading current pulse neuron information;
calculating current pulse neuron output information according to the front end pulse neuron output information and the current pulse neuron information;
reading a current self-adaptive threshold variable and a threshold potential, and calculating a current self-adaptive threshold according to the current self-adaptive threshold variable and the threshold potential;
judging whether the current pulse neuron output information is greater than or equal to the self-adaptive threshold,
if yes, outputting the current pulse neuron output information and updating the current self-adaptive threshold variable according to a first self-adaptive threshold update model to increase difficulty of issuing a pulse sequence of a next time step,
if no, not outputting the current pulse neuron output information, and updating the current self-adaptive threshold variable according to a second self-adaptive threshold update model to reduce difficulty of issuing the pulse sequence of the next time step,
wherein the first self-adaptive threshold update model resets a refractory period timer, and the second self-adaptive threshold update model cumulatively times the refractory period timer and updates the current self-adaptive threshold variable in a case that a current time step of the refractory period timer indicates that current time is not in a refractory period.

2. The self-adaptive threshold neuron information processing method according to claim 1, wherein
the front end pulse neuron output information includes: pulse tip information output by a front end pulse neuron, a connection weight index of a front end pulse neuron and a current pulse neuron;
the current pulse neuron information includes: a current time window width, a pulse tip information sequence in a current time window, historical membrane potential information and membrane potential leakage information; and
then calculating current pulse neuron output information according the front end pulse neuron output information and the current pulse neuron information comprises:

according to the connection weight index of the front end pulse neuron and the current pulse neuron, reading the connection weight of the front end pulse neuron and the current pulse neuron;

updating the pulse tip information sequence in the current time window according to the pulse tip information output by the front end pulse neuron and the pulse tip information sequence in the current time window, to obtain a pulse tip information updated sequence in the current time window;

calculating front end pulse neuron input information by an attenuation function according to the current time window width and the pulse tip information updated sequence in the current time window; and calculating current pulse neuron output information by a pulse neuron calculation model according to the front end pulse neuron input information, the connection weight of the front end pulse neuron and the current pulse neuron, the historical membrane potential information and the membrane potential leakage information.

3. The self-adaptive threshold neuron information processing method according to claim 2, wherein the outputting the current pulse neuron output information when the current pulse neuron output information is greater than or equal to the self-adaptive threshold, and updating the current self-adaptive threshold variable according to a first self-adaptive threshold update model, further comprise:

determining that issuance trigger flag information is issuance trigger, and the issuance trigger flag information includes issuance trigger or issuance no trigger; and updating the historical membrane potential information as preset reset membrane potential information.

4. The self-adaptive threshold neuron information processing method according to claim 3, wherein the not outputting the current pulse neuron output information, and updating the current self-adaptive threshold variable according to a second self-adaptive threshold update model, further comprise:

determining the issuance trigger flag information is issuance no trigger;

if current time is in the refractory period, not updating the historical membrane potential information; and if current time is not in the refractory period, updating the historical membrane potential information as the current pulse neuron output information.

5. The self-adaptive threshold neuron information processing method according to claim 3, wherein the outputting the current pulse neuron output information comprises:

reading an issuance enablement identifier, wherein the issuance enablement identifier includes allowance of issuing data or no allowance of issuing data, when the issuance enablement identifier is allowance of issuing data, reading the issuance trigger flag information when the issuance trigger flag information is issuance trigger; and outputting the current pulse neuron output information.

6. The self-adaptive threshold neuron information processing method according to claim 1, wherein the reading a current self-adaptive threshold variable and a threshold potential, and calculating a current self-adaptive threshold according to the current self-adaptive threshold variable and the threshold potential, comprise:

reading a random threshold mask potential, a threshold offset, a current self-adaptive threshold variable and a random threshold;

performing a bitwise AND operation on the random threshold and the random threshold mask potential to obtain a threshold random superposition amount;

determining the threshold potential according to the threshold random superposition amount and the threshold offset; and determining the current self-adaptive threshold according to the threshold potential and the current self-adaptive threshold variable.

7. The self-adaptive threshold neuron information processing method according to claim 1, wherein the updating the current self-adaptive threshold variable according to a first self-adaptive threshold update model comprises:

reading an issuance threshold increment and the current self-adaptive threshold variable;

calculating a first threshold according to a preset attenuation constant and the current self-adaptive threshold variable;

superposing the issuance threshold increment to the first threshold to obtain a second threshold; and updating the current self-adaptive threshold variable according to the second threshold.

8. The self-adaptive threshold neuron information processing method according to claim 7, wherein the updating the current self-adaptive threshold variable according to a second self-adaptive threshold update model comprises:

reading the current self-adaptive threshold variable;

calculating a third threshold according to the preset attenuation constant and the current self-adaptive threshold variable; and updating the current self-adaptive threshold variable according to the third threshold.

9. A computer system, comprising a processor, a memory and computer instructions stored in the memory, when the computer instructions are executed by the processor, the processor performing the steps comprising:

receiving front end pulse neuron output information;

reading current pulse neuron information;

calculating current pulse neuron output information according to the front end pulse neuron output information and the current pulse neuron information;

reading a current self-adaptive threshold variable and a threshold potential, and calculating a current self-adaptive threshold according to the current self-adaptive threshold variable and the threshold potential;

judging whether the current pulse neuron output information is greater than or equal to the self-adaptive threshold, if yes, outputting the current pulse neuron output information and updating the current self-adaptive threshold variable according to a first self-adaptive threshold update model to increase difficulty of issuing a pulse sequence of a next time step, if no, not outputting the current pulse neuron output information, and updating the current self-adaptive threshold variable according to a second self-adaptive threshold update model to reduce difficulty of issuing the pulse sequence of the next time step, wherein the first self-adaptive threshold update model resets a refractory period timer, and the second self-adaptive threshold update model cumulatively times the refractory period timer and updates the current self-adaptive threshold variable in a case that a current time step of the refractory period timer indicates that current time is not in a refractory period.

10. A self-adaptive leakage value neuron information processing method, executed by a processor, comprising:
  receiving front end pulse neuron output information;
  reading current pulse neuron information, wherein the current pulse neuron information comprises self-adaptive membrane potential leakage information, and historical membrane potential information;
  calculating current pulse neuron output information according to the front end pulse neuron output information, the historical membrane potential information, and the current pulse neuron information;
  updating the self-adaptive membrane potential leakage information according to the current pulse neuron output information; and
  outputting the current pulse neuron output information;
  wherein the method further comprises:
  resetting a refractory period timer and updating the historical membrane potential information as preset reset membrane potential information, when the current pulse neuron output information has been issued;
  cumulatively timing the refractory period timer one time step, not updating the historical membrane potential information and updating the historical membrane potential information in a case that a current time step of the refractory period timer indicates that current time is not in a refractory period, when the current pulse neuron output information has not been issued.

11. The self-adaptive leakage value neuron information processing method according to claim 10, wherein
  the front end pulse neuron output information comprises: pulse tip information output by a front end pulse neuron, a connection weight index of a front end neuron and a current neuron;
  the current pulse neuron information further comprises: a current time window width, a pulse tip information sequence in a current time window;
  then the calculating current pulse neuron output information according to the front end pulse neuron output information and the current pulse neuron information, comprises:
  reading the connection weight of the front end neuron and the current neuron according to the connection weight index of the front end neuron and the current neuron;
  updating the pulse tip information sequence in the current time window according to the pulse tip information output by the front end pulse neuron and the pulse tip information sequence in the current time window, to obtain a pulse tip information updated sequence in the current time window,
  calculating front end pulse neuron input information by an attenuation function according to the current time window width and the pulse tip information updated sequence in the current time window; and
  calculating current pulse neuron output information by a pulse neuron calculation model according to the front end pulse neuron input information, the connection weight of the front end pulse neuron and the current pulse neuron, the historical membrane potential information, and the self-adaptive membrane potential leakage information.

12. The self-adaptive leakage value neuron information processing method according to claim 11, wherein after the calculating current pulse neuron output information according to the front end pulse neuron output information and the current pulse neuron information, before the outputting the current pulse neuron output information, the method further comprises:
  obtaining a threshold potential; and
  comparing the current pulse neuron output information with the threshold potential, and determining issuance trigger flag information according to a comparison result, wherein the issuance trigger flag information includes: issuance trigger or issuance no trigger,
  wherein the issuance trigger flag information is issuance trigger which indicates that the current pulse neuron output information has been issued.

13. The self-adaptive leakage value neuron information processing method according to claim 12, further comprising:
  reading a refractory period width and a current time step of a refractory period timer when the issuance trigger flag information is issuance no trigger;
  judging whether current time is in the refractory period according to the refractory period width and the current time step of the refractory period timer,
  wherein if current time is in the refractory period, the historical membrane potential information would not be updated.

14. The self-adaptive leakage value neuron information processing method according to claim 12, wherein the obtaining a threshold potential comprises:
  reading a random threshold mask potential, a threshold offset and a random threshold;
  performing a bitwise AND operation on the random threshold and the random threshold mask potential to obtain a threshold random superposition amount; and
  determining the threshold potential according to the threshold random superposition amount and the threshold offset.

15. The self-adaptive leakage value neuron information processing method according to claim 12, wherein the outputting the current pulse neuron output information, comprises:
  reading an issuance enablement identifier, and the issuance enablement identifier comprises allowance of issuing data or no allowance of issuing data; when the issuance enablement identifier is allowance of issuing data;
  reading the issuance trigger flag information when the issuance trigger flag information is issuance trigger; and
  outputting the current pulse neuron output information.

16. The self-adaptive leakage value neuron information processing method according to claim 10, wherein the updating the self-adaptive membrane potential leakage information according to the current pulse neuron output information comprises:
  reading resting membrane potential information and a leakage value scaling factor;
  updating the self-adaptive membrane potential leakage information according to the resting membrane potential information, the leakage value scaling factor and the current pulse neuron output information.

* * * * *